United States Patent
Nakagawa et al.

(10) Patent No.: US 7,918,649 B2
(45) Date of Patent: Apr. 5, 2011

(54) DOUBLE-ROW SELF-ALIGNING ROLLER BEARING AND DEVICE FOR SUPPORTING WIND TURBINE GENERATOR MAIN SHAFT

(75) Inventors: Naoki Nakagawa, Kuwana (JP); Masaharu Hori, Kuwana (JP); Takeshi Maeda, Kuwana (JP); Souichi Yagi, Kuwana (JP); Mitsuo Sasabe, Osaka (JP); Nobuyuki Mori, Kuwana (JP)

(73) Assignee: NTN Corporation, Osaka (JP)

( * ) Notice: Subject to any disclaimer, the term of this patent is extended or adjusted under 35 U.S.C. 154(b) by 1274 days.

(21) Appl. No.: 10/579,567

(22) PCT Filed: Nov. 16, 2004

(86) PCT No.: PCT/JP2004/016977
§ 371 (c)(1),
(2), (4) Date: May 17, 2006

(87) PCT Pub. No.: WO2005/050038
PCT Pub. Date: Jun. 2, 2005

(65) Prior Publication Data
US 2007/0127858 A1 Jun. 7, 2007

(30) Foreign Application Priority Data

Nov. 18, 2003 (JP) ................................. 2003-388314
Jan. 23, 2004 (JP) ................................. 2004-015341
Sep. 21, 2004 (JP) ................................. 2004-273029
Sep. 21, 2004 (JP) ................................. 2004-273030

(51) Int. Cl.
*F03D 11/04* (2006.01)

(52) U.S. Cl. ........ 416/174; 384/568; 384/558; 384/563; 384/567; 384/569; 384/450

(58) Field of Classification Search .................. 384/568, 384/558, 567, 563, 569, 450; 416/174; 415/229–231
See application file for complete search history.

(56) References Cited

U.S. PATENT DOCUMENTS

| 1,350,263 | A | | 8/1920 | Palmgren |
| 1,736,426 | A | * | 11/1929 | Bond ............................ 415/229 |
| 3,910,656 | A | | 10/1975 | Price et al. |
| 3,934,957 | A | | 1/1976 | Derner |
| 3,990,753 | A | | 11/1976 | Kellstrong et al. |
| 4,227,754 | A | | 10/1980 | Kellström |
| 4,248,487 | A | | 2/1981 | Asberg |

(Continued)

FOREIGN PATENT DOCUMENTS

AO 2000-074051 3/2000

(Continued)

OTHER PUBLICATIONS

"The New Generation of NTN Bearings for Wind Turbine", A65. CAT. No. 8404/JE, published May 1, 2003, by NTN Co. Ltd., pp. 1-6.

(Continued)

*Primary Examiner* — Christopher Verdier

(57) ABSTRACT

A double-row self-aligning roller bearing includes left and right rows of rollers, arranged between an inner race and an outer race. A raceway surface of the outer race represents a spherical shape and the rollers have an outer peripheral surface following the shape of the raceway surface of the outer race. The rollers of the left and right roller rows have respective lengths different from each other. Also, the left and right roller rows have respective contact angles different from each other.

21 Claims, 13 Drawing Sheets

U.S. PATENT DOCUMENTS

| | | | |
|---|---|---|---|
| 4,333,695 A | 6/1982 | Evans | |
| 4,345,800 A | 8/1982 | Hofmann et al. | |
| 4,557,613 A | 12/1985 | Tallian et al. | |
| 4,828,404 A | 5/1989 | Takata | |
| 4,916,750 A | 4/1990 | Scott | |
| 4,929,098 A | 5/1990 | Takata et al. | |
| 5,145,267 A | 9/1992 | Takata et al. | |
| 5,852,947 A | 12/1998 | Tsujimoto et al. | |
| 5,975,762 A | 11/1999 | Ai | |
| 6,116,785 A | 9/2000 | Kondo et al. | |
| 6,296,395 B1 | 10/2001 | Brand et al. | |
| 6,814,494 B2 | 11/2004 | Borowski et al. | |
| 2003/0198416 A1 | 10/2003 | Borowski et al. | |
| 2005/0148425 A1* | 7/2005 | Nakagawa et al. | 475/348 |
| 2007/0127858 A1 | 6/2007 | Nakagawa et al. | |
| 2007/0297706 A1* | 12/2007 | Mori | 384/558 |

FOREIGN PATENT DOCUMENTS

| | | |
|---|---|---|
| CA | 2316183 | 5/2000 |
| DE | 70 03 667 | 2/1970 |
| DE | 27 39 367 | 10/1978 |
| DE | 29 35 023 | 3/1980 |
| DE | 9100650.3 U | 5/1991 |
| DE | 41 04 454 C1 | 7/1992 |
| EP | 1 160 469 A2 | 12/2001 |
| FR | 425081 A | 6/1911 |
| GB | 139512 | 7/1920 |
| GB | 539502 | 9/1941 |
| GB | 2 362 928 | 12/2001 |
| GB | 2 371 603 | 7/2002 |
| JP | 54-38749 | 3/1979 |
| JP | 54-38749 U | 3/1979 |
| JP | 61-171917 | 8/1986 |
| JP | 62-282173 | 12/1987 |
| JP | 1-128022 | 8/1989 |
| JP | 01-224523 | 9/1989 |
| JP | 04-039414 | 2/1992 |
| JP | 7-238926 | 9/1995 |
| JP | 8-326759 | 12/1996 |
| JP | 10-184677 | 7/1998 |
| JP | 2000-161368 | 6/2000 |
| JP | 2000-204444 | 7/2000 |
| JP | 2000-320550 | 11/2000 |
| JP | 2000-356218 | 12/2000 |
| JP | 2001-140874 | 5/2001 |
| JP | 2001-520354 | 10/2001 |
| JP | 2002-31148 | 1/2002 |
| JP | 2002-147449 | 5/2002 |
| JP | 2003-130057 | 5/2003 |
| JP | 2003-184885 | 7/2003 |
| JP | 2003-293940 | 10/2003 |
| JP | 2003-301850 | 10/2003 |
| JP | 2004-011737 | 1/2004 |
| JP | 2004-019731 | 1/2004 |
| JP | 2004-245251 | 9/2004 |
| WO | 99/19639 | 4/1999 |
| WO | 02/079644 A1 | 10/2002 |
| WO | 03/014566 A1 | 2/2003 |
| WO | WO 03/038295 A1 | 5/2003 |
| WO | 2004/027277 A1 | 4/2004 |
| WO | WO-2006/033320 A1 * | 3/2006 |

OTHER PUBLICATIONS

Preliminary Notice of Rejection issued in corresponding Japanese Patent Application No. 2003-388314, mailed on Sep. 18, 2007.

Japanese Office Action issued Sep. 15, 2009 in corresponding Japanese Patent Application 2005-003498.

European Search Report issued May 2, 2007 on corresponding European Patent Application No. 04818890.8.

Office Action issued in corresponding Japanese Patent Application No. 2003-388314; mailed on Apr. 22, 2008.

Japanese Patent Office Notice of Reasons for Rejection, mailed Jan. 15, 2008 and issued in corresponding Japanese Patent Application No. 2003-388314.

U.S. Appl. No. 11/663,162, filed Mar. 19, 2007, Nobuyuki Mori, NTN Corporation.

English Translation of the International Preliminary Report on Patentability issued Mar. 27, 2007 related to U.S. Appl. No. 11/663,162.

Ball Bearing Journal, No. 203, pp. 1-5, ISSN 0308-1664, published May 1980.

European Patent Office Brief Communication dated Oct. 15, 2010 with Opposition by Schaeffler Technologies GmbH & Co. KG in corresponding European Patent Application 04818890.8.

European Patent Office Brief Communication dated Oct. 15, 2010 with Opposition by SKF Sverige AB in corresponding European Patent Application 04818890.8.

U.S. Restriction Requirement mailed Jan. 22, 2010 in related U.S. Appl. No. 11/663,162.

U.S. Office Action mailed Mar. 25, 2010 in related U.S. Appl. No. 11/663,162.

U.S. Office Action mailed Sep. 14, 2010 in related U.S. Appl. No. 11/663,162.

U.S. Notice of Allowance mailed Dec. 15, 2010 in related U.S. Appl. No. 11/663,162.

* cited by examiner

Fig. 15 - Prior Art
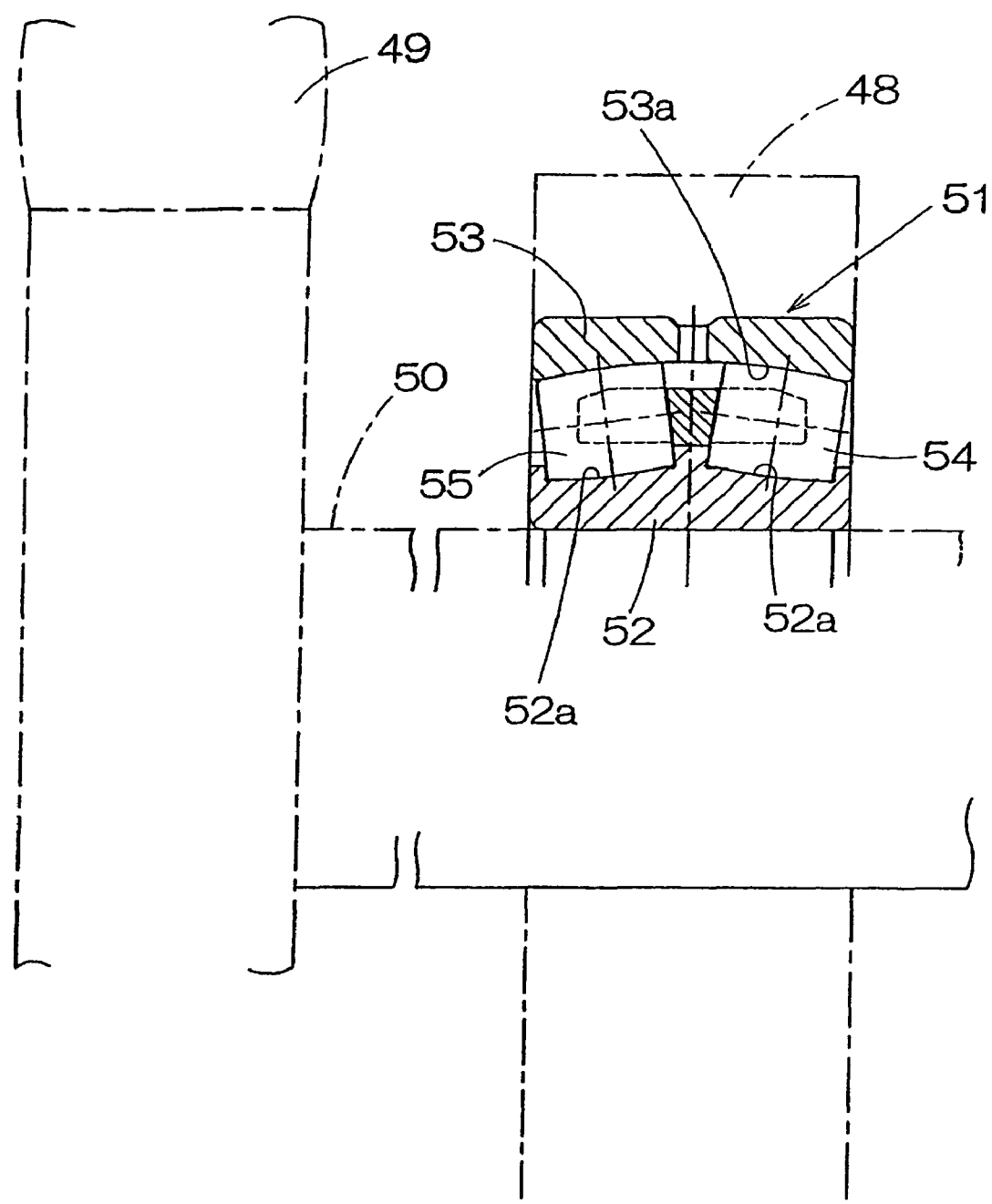

DOUBLE-ROW SELF-ALIGNING ROLLER BEARING AND DEVICE FOR SUPPORTING WIND TURBINE GENERATOR MAIN SHAFT

This application claims the benefit of PCT International Application Number PCT/JP2004/016977 filed Nov. 16, 2004 and Japanese Application Nos. 2003-388314, filed Nov. 18, 2003, 2004-015341, filed Jan. 23, 2004, 2004-273029, filed Sep. 21, 2004 and 2004-273030, filed Sep. 21, 2004 in Japan, the disclosures of which are incorporated herein by reference.

FIELD OF THE INVENTION

The present invention relates to a double-row self-aligning roller bearing for use in the field of application, where uneven loads tend to act on left and right rows of spherical rollers, for example, in a bearing portion for supporting a main shaft of the wind turbine generator, and also to a support device for supporting the wind turbine generator main shaft.

DISCLOSURE OF THE INVENTION

In recent years, the wind power generation is attracting a lot of attention as it utilizes clean and inexhaustible energies. In large size wind power generating facilities, the nacelle accommodating a wind turbine generator drivingly coupled with a blade rotor through a main shaft is mounted on a support a few tens of meters high above the ground surface and, therefore, maintenance of a bearing assembly used to support the main shaft of the blade rotor involves a substantial amount of labor and risks. For this reason, the bearing assembly for the support of the main shaft of the wind power generator is required to have a high reliability and a long enduring life.

The self-aligning roller bearing assembly suitable for rotatably supporting the main shaft of the wind power generator is disclosed in, for example, the Japanese Laid-open Patent Publication No. 2004-11737. For the bearing for the main shaft of the large size wind power generator, a large size dual row self-aligning roller bearing assembly 51 such as shown in FIG. 15 is largely employed. A main shaft 50 is represented by a wind shaft having a blade rotor 49 mounted thereon and rotates, when the blade rotor receives a current of wind, to provide a driving force, which is, after having been boosted up by a speed-up gear unit (not shown), utilized to drive the wind turbine generator to cause the latter to provide electricity.

When the electric power is generated on the strength of the wind, the main shaft 50 supporting the blade rotor 49 is loaded with not only an axial load (a bearing thrust load) acting on the blade rotor 49 as a result of the wind, but also a radial load (a bearing radial load). The double-row self-aligning roller bearing 51 can support both of the radial and thrust loads simultaneously and, since it has an aligning capability, not only can the inclination of the main shaft 50 resulting from errors in precision and mounting of the bearing housing 48 be accommodated, but the flexure of the main shaft 50 during operation can also be accommodated. For this reason, the double-row self-aligning roller bearing is suitable for use with the main shaft of the wind power generator and is utilized in practice. (See, for example, a catalogue entitled "The New Generation of NTN Bearings for Wind Turbine)", A65. CAT. No. 8404/JE, published May 1, 2003, by NTN Co. Ltd.)

However, in the blade rotor, the unidirectional thrust load is high as compared with the radial load and, of the dual rows of rollers 54 and 55, the row of the rollers 54 intended to support the thrust load is mostly loaded with the radial load and the thrust load simultaneously. Because of this, the rolling fatigue life tends to be reduced. In addition, the opposite row of the rollers is imposed with such a light load that slippage of the rollers 55 may take place relative to respective raceway surfaces 52a and 53a of inner and outer races 52 and 53, resulting in a problem associated with surface damages and frictional wear. For this reason, the bearing assembly of a relatively large size is employed and/or the lubricating ability is increased to cope with this problem, but the row of the rollers tending to receive the light load may have an excessively large leeway and this is not economical. Also, in the case of the bearing assembly for the support of the main shaft of the wind power generator that is installed at a high position and is operated with unattended feature, it has been desired that lubrication must be simple in order to render the bearing assembly to be maintenance-free.

DISCLOSURE OF THE INVENTION

An object of the present invention is to provide a double-row self-aligning roller bearing, in which in the event that such bearing assembly is used in the environment in which uneven loads act on left and right rows of rollers, the respective rows of the rollers can accommodate applied loads with the life substantially extended consequently and which is so economical that material, processing and machining can be performed with no waste.

A double-row self-aligning roller bearing according to a first construction of the present invention includes left and right rows of rollers, arranged between an inner race and an outer race, in which bearing portions accommodating the left and right roller rows have respective load carrying capacities different from each other. The load carrying capacities to be differentiated may be a load carrying capacity relative to one or both of radial and thrust loads.

For the structure in which the bearing portions accommodating the left and right roller rows, respectively, have different load carrying capacities, the rollers of the left row may have at least one of the dimensions and shape that is different from that of the rollers of the right row. By way of example, the rollers of the left or right rows may have a length different from that of the rollers of the other of the left and right rows. Also, the rollers of the left or right rows may be employed in the form of an axially hollowed roller having an axial hollow defined therein. The left and right rollers may have different radial dimensions. A structure may be provided in which one of the bearing portions having the left roller row may have a load carrying capacity different from that of the other of the bearing portions having the right roller row. The rollers of the left and right rows may have different lengths and at the same time the left and right bearing portions may have different contact angles.

It is to be noted that this double-row self-aligning roller bearing is used at a location where a different load acts on the left and right roller rows and, for example, the bearing portion loaded with the thrust load has a large contact angle and the rollers of such bearing portion have a large length, but the other bearing portion has a small contact angle and the rollers of such roller row has a small length.

If the rollers of the different lengths are used for the left and right roller rows to allow the left and right bearing portions to have different load carrying capacities as described above, and where the roller bearing is used in the application where uneven load tend to act on the left and right roller rows, each of the left and right bearing portions can accommodate the load appropriately. Accordingly, it is possible to avoid an undesirable increase of the load carrying capacity on the light load side to thereby avoid waste of material. Also, generation of slippage of the rollers due to light load will hardly occur, avoiding surface damages and frictional wear. In view of these, the substantial life of the bearing assembly increases generally.

More specifically, where the different dimension such as the length of the rollers or the outer diameter of the rollers is used, the load carrying capacity of the row of the rollers of a large dimension increases. On the other hand, in the row of the roller of a small dimension, the weight of the rollers decreases, resulting in alleviation of slippage and also alleviation of the frictional wear and surface damages. Even where the rollers of one row are employed in the form of a hollow roller, the weight of the roller of that row decreases, resulting in alleviation of slippage and also alleviation of the frictional wear and surface damages.

With respect to the contact angle, the thrust load can be accommodated more than the radial load as the contact angle increases. For this reason, the roller row having an increased contact angle can have a high power to support the thrust load. The roller row having a small contact angle results in increase of the stress of contact between the rollers and the raceway surface and, accordingly, not only can the slippage be alleviated, but the frictional wear and surface damages can also be alleviated.

Where the left and right bearing portions are designed to have a different load carrying capacity, to render the rollers of the left and right rows to have a different length or to render the left and right bearing portions to have a different contact angle is effective to minimize change of the design of the radial dimensions of the inner and outer races for securing a sufficient wall thickness in each of the inner and outer races as compared with the use of the rollers of a different roller diameter, or requires no change in design, and accordingly, even if the left and right roller rows are asymmetrical, designing and manufacture can be easily accomplished.

Where as a structure in which the respective weights of the rollers differ from each other between the left and right rows to thereby alleviate the slippage, the rollers of either one of the left and right roller rows are employed in the form of a hollow roller having a hollow defined in the center thereof, conventionally employed symmetrical type can be used for the inner and outer races and, accordingly, designing and manufacture can further be facilitated.

The double-row self-aligning roller bearing of any of the foregoing constructions according to the present invention may make use of the outer race divided into two axially juxtaposed split outer races.

Where the outer race is of a split construction, the two split outer races can be manufactured separately and, therefore, the outer race of an asymmetry can easily be manufactured.

Where the outer race is employed in the form of the outer race of the split construction as hereinabove described, a gap may be provided between the two split outer races and a preload may then be applied to those split outer races. The preload is preferred to be applied from the side of the bearing portion having the row of the smaller rollers.

When the preload is applied in this manner, the slippage of the rollers can be suppressed. Accordingly, while manufacture of the outer race is easy to accomplish as the split structure, suppression of the slippage can be obtained.

The double-row self-aligning roller bearing according to a second construction of the present invention includes left and right rows of spherical rollers arranged between an inner race and an outer race, in which the bearing is in its entirety divided into left and right split bearing portions each including a split inner race, a split outer race and a single row of rollers, and in which elements associated with a load or a life are differentiated between the left and right split bearing portions.

When the elements associated with the load or the life are differentiated between the left and right split bearing portions, each of the left and right bearing portions can accommodate the load appropriately in the event that the roller bearing is used in the application where uneven load acts on the left and right roller rows. Accordingly, it is possible to avoid any undesirable waste in, for example, material, reforming treatment and processing on the light load side, which would otherwise occur as a result of an excessive increase of the rated life and the load carrying capacity. Since the bearing assembly is divided into the left and right split bearing portions, the different elements associated with the load or the life can easily be applied in the left and right split bearing portions. Also, since it is sufficient for only the split bearing portion on the heavy load side to be so designed as to have an increased load carrying capacity and an increased life, the cost of manufacture can be reduced as compared with the case in which those measures are applied to the bearing assembly in its entirety.

The element associated with the load or the life, which is to be differentiated between the left and right split bearing portions, may be one or all of the material, the surface reforming treatment and the surface roughness.

Where one of the different material, the different surface reforming treatment and the different surface roughness is employed, it may be applied to at least one of the split inner race, the split outer race and the rollers. With respect to the surface reforming treatment and the surface roughness, they may be applied to the raceway surface in the case of the split inner race and the split outer race, and the different surface reforming treatment or the different surface roughness is employed on the rolling surfaces in the case of the rollers.

Where the different material is to be employed, the light load side, for example, may be a high carbon chrome steel that is generally used in bearings, and the heavy load side may be a carburized material or the like. When the high carbon chrome steel or the like is used in the light load side, the cost of material can be reduced.

For the surface reforming treatment, a treatment to increase the surface hardness, for example, nitriding treatment or the like is available and is applied only to the heavy load side. The light load side may not be applied the surface reforming treatment, with the cost reduced consequently.

With respect to the surface roughness, the surface roughness on the heavy load side is preferred to be minimized. As the surface roughness is minimized, the lubricity increases, resulting in increase of the life. When the surface roughness in the light load side is chosen to be of a value standard in the bearings, the processing cost can be reduced.

The left and right split bearing portions, accommodating the left and right roller rows, may be of the same size. In other words, the respective dimensions of the split inner races, the split outer races and the rollers in the bearing portion accommodating the left roller row may be the same as those in the bearing portion accommodating the right roller row. If even though the dimension of the split bearing portion accommodating the left roller row is the same as that of the split bearing portion accommodating the right roller row, any one of the different material, the different surface reforming treatment and the different surface roughness is employed in the split bearing portions accommodating respectively the left and right roller rows, each of the left and right split bearing portions can accommodate the load appropriately, with the substantial life increased consequently.

As one of the elements associated with the load or the life, which are to be differentiated between the left and right bearing portions, different axial dimensions of the inner and outer races in the corresponding split bearing portions and different axial dimensions of the rollers may be employed.

If the different axial dimensions of the rollers are employed in the left and right roller rows, the load carrying capacities of the left and right roller rows are correspondingly different from each other. In such case, each of the left and right bearing portions can accommodate the load appropriately. Accordingly, it is possible to avoid an undesirable increase of the load carrying capacity and life on the light load side to thereby avoid waste of material. Also, generation of slippage of the rollers due to light load will hardly occur, avoiding surface damages and frictional wear. In view of these, the substantial life of the bearing increases generally.

Because of the split structure of the bearing employed, it is sufficient to manufacture individually the split inner races and the split outer races for the respective roller rows and, therefore, the double-row self-aligning roller bearing of an asymmetrical configuration can easily be manufactured.

Even where the different axial dimensions of the left and right split bearing portions are employed, the additional element associated with the load or the life, which are to be differentiated, may be one or all of the material, the surface reforming treatment of the raceway surfaces or the roller surfaces and the surface roughness of the raceway surfaces or the rolling surfaces of the rollers.

In the double-row self-aligning roller bearing of any one of the foregoing construction according to the present invention, a gap may be provided between the two split outer races and a preload may then be applied to those split outer races. Preferably, the preload is applied from the side of the bearing portion having the roller row on the light load side.

When the preload is applied in this manner, the slippage of the rollers can be suppressed. Accordingly, while manufacture of the outer race is easy to accomplish as the split structure, suppression of the slippage can be obtained.

A combination double-row self-aligning roller bearing according to a third construction of the present invention includes two single-row self-aligning roller bearings juxtaposed axially relative to each other, and in which elements associated with a load or a life are differentiated between the two single-row self-aligning roller bearings.

In this third construction, instead of the two split bearing portions being combined to provide a single bearing assembly such as in any one of the foregoing examples, the two single-row self-aligning roller bearings each operable independently are axially juxtaposed and are so designed as to have the different elements associated with the load or the life. Even in the case of this construction, each of the left and right bearings can accommodate the load appropriately when uneven load acts on those left and right roller rows and, therefore, not only can the substantial life be increased, but it is so economical in the sense that no waste of material occur.

The double-row self-aligning roller bearing according to a preferred embodiment of the present invention may be of a structure in which assuming that the length of the spherical rollers of one of the roller rows is expressed by L1, the length of the spherical rollers of the other of the roller rows is expressed by L2, and the length of a major axis of a contact ellipse generated in a plane of contact between the rollers of one of the roller rows and the raceway member is expressed by A, the following dimensional relationship establishes:

$$L1<L2 \text{ and } L1>A$$

If the spherical rollers of the left and right rows have different lengths as described above, the spherical rollers of those roller rows can have a different load carrying capacity. Accordingly, if the roller row having an increased load carrying capacity includes the longer spherical rollers and the roller row on the light load side includes the shorter spherical rollers, each of the left and right bearing portions can accommodate the load appropriately, with the bearing life increased consequently. In the case of the spherical rollers in the roller row on the light load side, increase of the length of the rollers is limited. In other words, the spherical rollers must have a length enough to sufficiently support the load during the use. In view of this, in the present invention, the spherical rollers on the light load side have a length greater than the length of the major axis of the contact ellipse generated in the plane of contact between the spherical rollers and the raceway member. If the spherical rollers having a length greater than the length of the major axis of the contact ellipse are employed, the load during the use can be sufficiently withstood and an increased life can be obtained.

When the spherical rollers and the raceway surface of the raceway member receive the load, the contact plane deforms elastically, resulting in a round contact plane around the point of contact. This round contact plane is called the "contact ellipse".

For the spherical rollers, they may be symmetrical rollers having a maximum diameter positioned at a location intermediate of the length of the rollers or they may be asymmetrical rollers having a maximum diameter positioned at a location displaced from a point intermediate of the length of the rollers.

The double-row self-aligning roller bearing according to another preferred embodiment of the present invention may be of a structure in which assuming that the radius of curvature of a ridge of the rollers of one of the roller rows is expressed by R1, the radius of curvature of a ridge of the rollers of the other of the roller rows is expressed by R2, the radius of curvature of the raceway surface of the inner race, with which the rollers of one of the roller rows contact, is expressed by N1, and the radius of curvature of the raceway surface of the inner race, with which the rollers of the other of the roller rows contact, is expressed by N2, the following dimensional relationship establishes:

$$N1/R1<N2/R2$$

In the self-aligning roller bearing assembly, the radius of curvature N of the raceway surface of the inner race is generally greater than the radius of curvature R of the ridge of the spherical rollers. If the ratio N/R is relatively small enough to approach 1, the contact ellipse will have an increased size during the operation and the maximum load stress at the point of contact becomes small. On the other hand, if the ratio N/R is relatively large, the contact ellipse will have a reduced size during the operation and the maximum load stress at the point of contact becomes large. Accordingly, the use of the different ratios N/R for the left and right roller rows, respectively, is effective to allow the roller rows to perform a control of the bearing pressure appropriate to the load.

If the ratio N/R of the roller row on the high load side is relatively small, the edge stress in the vicinity of opposite ends of the self-aligning roller bearing assembly becomes large and there is the possibility that problems such as earlier frictional wear and exfoliation will occur. In view of this, the relatively large ratio N/R is used for the roller row on the high load side to thereby reduce the edge stress.

Slippage does easily occur between the spherical rollers and the raceway surface for the roller row on the light load side and skew also occurs easily. In view of this, in an attempt to suppress the occurrence of the skew of the rollers, the ratio N/R of a relatively small value is employed for the roller row on the light load side to thereby increase the size of the contact ellipse.

To change the ratio N/R, it can be accomplished by differentiating the radius of curvature of the ridge of the spherical rollers between the left and right roller rows or differentiating the radius of curvature of the raceway surfaces of the inner race between the left and right roller rows. Both of the radius of the ridge of the rollers and the radius of curvature of the raceway surface of the inner race may be differentiated simultaneously. In one embodiment, the radius of curvature R1 of the spherical rollers of one roller row is chosen to be greater than the radius of curvature R2 of the spherical rollers of the other roller row. In another embodiment, the radius of curvature N1 of the raceway surface of the inner race with which the spherical rollers of one roller row contact is chosen to be smaller than the radius of curvature N2 of the raceway surface of the inner race with which the spherical rollers of the other roller row contact.

One of the rows of the spherical rollers having the radius of curvature R1 may preferably have a length smaller than that of the other of the rows of the spherical rollers having the radius of curvature R2. This is particularly advantageous in that the edge stress of the spherical rollers, which are longer in length and have a large load carrying capacity, can be reduced and the skew of the spherical rollers, which are smaller in length and have a low load carrying capacity, can be suppressed effectively.

The self-aligning roller bearing assembly of any one of the foregoing constructions according to the present invention can be used as a main shaft support bearing for supporting a main shaft of a wind power generator having a blade rotor mounted on such main shaft for rotation together therewith.

In the bearing for the support of the main shaft of the wind power generator, since the thrust load acts in a biased fashion on one of the roller rows in the manner as described above under the influence of the wind pressure acting on the blade rotor mounted on the main shaft, effects of the double-row self-aligning roller bearing having left and right portions that are asymmetrical relative to each other in accordance with the present invention can be exhibited and, hence, an effect of increasing the substantial bearing life can be obtained.

The main shaft support structure for a wind power generator according to the present invention includes a main shaft having a blade rotor mounted thereon for rotation together therewith, and one or a plurality of bearing assemblies disposed inside a housing, in which said one or plurality of the bearing assemblies are employed in the form of a double-row self-aligning roller bearing of any one of the previously described constructions according to the present invention and include a first row of rollers remote from the blade rotor and a second row of rollers close to the blade rotor, and in which a bearing portion having the first roller rows has a load carrying capacity higher than that of a bearing portion having the second roller row.

By so constructing, an effect of increasing the substantial bearing life of the double-row self-aligning roller bearing used as the main shaft support bearing can be obtained.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 12B illustrates a contact ellipse defined at a point of contact of the spherical rollers with the raceway surfaces of the inner race, and FIG. 12C illustrates a pattern of distribution of loads at opposite ends of the spherical rollers;

FIG. 15 is a longitudinal sectional view showing the conventional double-row self-aligning roller bearing.

BEST MODE FOR CARRYING OUT THE INVENTION

Figure 1:
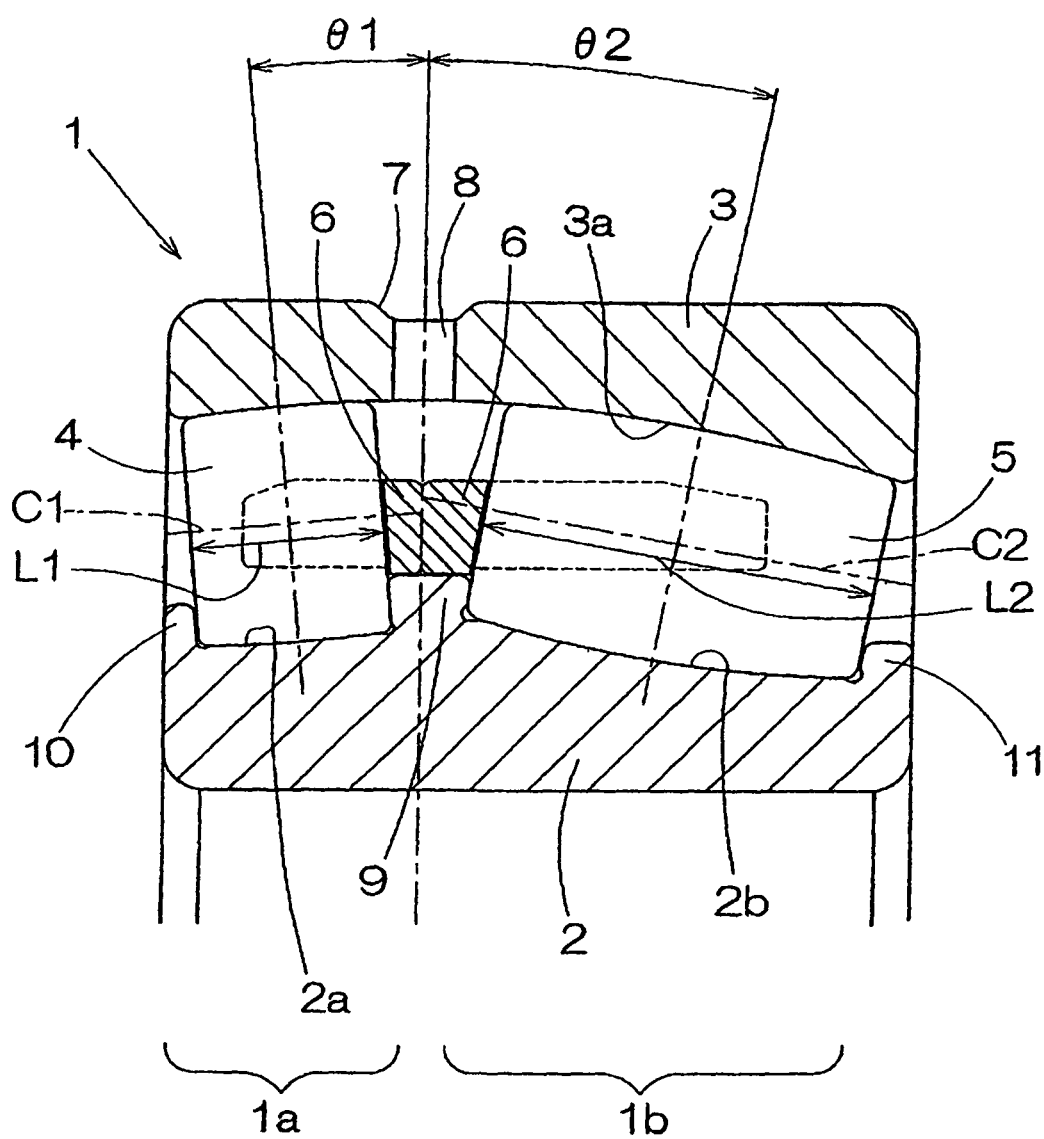
FIG. 1 is a fragmentary longitudinal sectional view of a double-row self-aligning roller bearing according to a first preferred embodiment of the present invention.

The first preferred embodiment of the present invention will be described in detail with particular reference to FIG. 1. A double-row self-aligning roller bearing 1 shown therein includes inner and outer races 2 and 3 with respective rows of spherical rollers 4 and 5 interposed between those inner and outer races 2 and 3. The rollers 4 and 5 of each row are retained by a roller retainer 6. The roller retainers 6 are separate from each other and are employed one for each row of the rollers 4 and 5. The outer race 3 has an inner peripheral surface formed with a raceway surface 3a that is defined therein so as to represent a spherical roller shape, and each of the rollers 4 and 5 has an outer peripheral surface that is so curved as to follow the curvature of the raceway surface 3a of the outer race 3, that is, as to represent a rotatory curved surface defined by rotating the arcuate shape, following the curvature of the raceway surface 3a, about the longitudinal axis of the corresponding rollers 3 and 4. The outer race 3 has an oil groove 7 defined in an outer peripheral surface thereof at a location generally intermediate between the rows of the rollers 3 and 4 and also has an oil passages 8 defined therein at one location or a plurality of circumferentially spaced locations so as to extend from the oil groove 7 and open at an inner peripheral surface thereof. The inner race 2 has an outer peripheral surface formed with two axially spaced raceway surfaces 2a and 2b that are defined therein so as to follow the respective curvatures of the outer peripheral surfaces of the rollers 4 and 5. The inner race 2 also has radially outwardly extending collars 9, 10 and 11, in which the collars 10 and 11 are defined in opposite ends of the inner race 2 and the collar 9 is defined at a location generally intermediate between the raceway surfaces 2a and 2b. It is, however, to be noted that the inner race 2 may be of a collarless type.

The left and right rows of the rollers 4 and 5 have different lengths L1 and L2 as measured along the longitudinal axes C1 and C2, respectively, and left and right bearing portions 1a and 1b have respective contact angles θ1 and θ2 different from each other. In this case, the contact angle θ2 of the bearing portion 1b, which accommodates the right row of the rollers 5 each having a length greater than that of the rollers 4 of the left row, is chosen to be greater than the contact angle θ1 of the bearing portion 1a, which accommodates the left row of the rollers 4 each having a length smaller than that of the rollers 5 of the right row. The rollers 4 and 5 of the left and right rows have, for example, the same maximum outer diameter. The rollers 4 and 5 of the left and right rows may have respective outer diameters different from each other. By way of example, the longer rollers 5 may have an outer diameter greater than that of the smaller rollers 4.

The double-row self-aligning roller bearing 1 is used in the field of application, in which uneven loads tend to act on the left and right rows of the rollers, for example, in which one of the roller rows supports both of the thrust load and the radial load and the other of the roller rows mostly supports only the radial load. More specifically, it is used for a main shaft of the wind power generator. In such case, the bearing portion capable of supporting the thrust load has a contact angle θ2 that is greater than that of the other bearing portion and utilizes the row of the rollers 5 each having a greater length L2. It is to be noted that the rollers 4 and 5 of the respective row may have either a symmetrical shape or a non-symmetrical shape.

As hereinabove described, since in the roller row designed to support the thrust load, the larger contact angle θ2 and the larger length L2 of the rollers are employed, the load carrying capacity of supporting the thrust load can be increased, resulting in increase of the rolling fatigue life. On the other hand, since in the opposite roller row, the smaller contact angle θ1 and the smaller length L1 of the rollers 4 are employed, the contact stress between the rollers 4 and the raceway surfaces 2a and 3a can increase and the weight of the rollers 4 can be reduced, resulting in lessening of the slippage. Accordingly, even under light load, the rollers 4 less tends to experience slippage and surface damage will hardly occur. In view of those functional features taken into consideration, the life of the double-row self-aligning roller bearing 1 that is utilized to support, for example, the main shaft of the wind power generator can increase.

Figure 2:
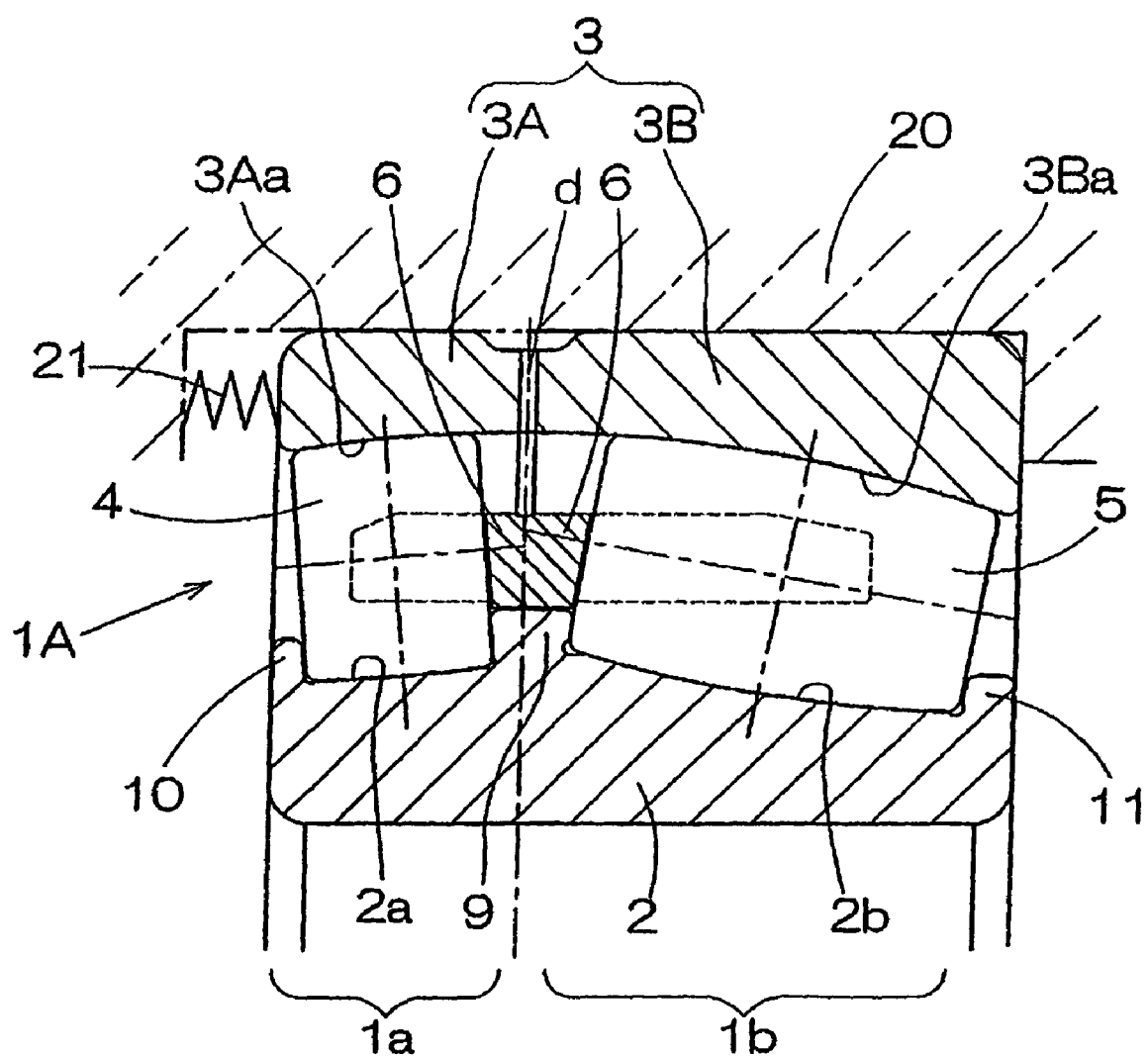
FIG. 2 is a fragmentary longitudinal sectional view of the double-row self-aligning roller bearing according to a second preferred embodiment of the present invention, showing the manner of mounting of the bearing assembly.

FIG. 2 illustrates a second preferred embodiment of the present invention. The double-row self-aligning roller bearing 1A shown therein is similar to the double-row self-aligning roller bearing 1 shown in and described with reference to FIG. 1 in connection with the first embodiment, except that as best shown therein the outer race 3 is divided into two split outer races 3A and 3B that are axially lined up. The split outer races 3A and 3B are so disposed as to form a gap d therebetween when held in a natural condition, that is, in a condition in which they have corresponding spherical raceway surfaces 3Aa and 3Ba occupying respective portions of the same spherical shape. While this double-row self-aligning roller bearing 1A is installed inside a bearing housing 20, the split outer races 3A and 3B are axially fastened together by the effect of a preload applied by a preload applying member 21 so as to reduce the gap d between the split outer races 3A and 3B. The preload applying member 21 may be employed in the form of, for example, a spring member or a fastening screw. Where the spring member is employed for the preload applying member 21, a compression spring, for example, may be employed and may be arranged at a plurality of locations circumferentially of the bearing assembly in contact with one end of the outer race 3. It is preferred that the preload applying member 21 is so disposed as to apply the preload to one of the split outer races, for example, the split outer race 3A utilizing the rollers 4 of a shorter length.

The use of the split structure in the outer race 3 as described above is effective to allow the outer race 3 of an asymmetrical configuration to be manufactured easily. Also, when the preload is applied while the outer race 3 is so configured and so structured as to have the split structure, the slippage of the rollers 4 can be positively suppressed.

Other structural features of and effects afforded by the second embodiment described above are similar to those of the first embodiments and, accordingly, like parts are designated by like reference numerals.

Figure 3:
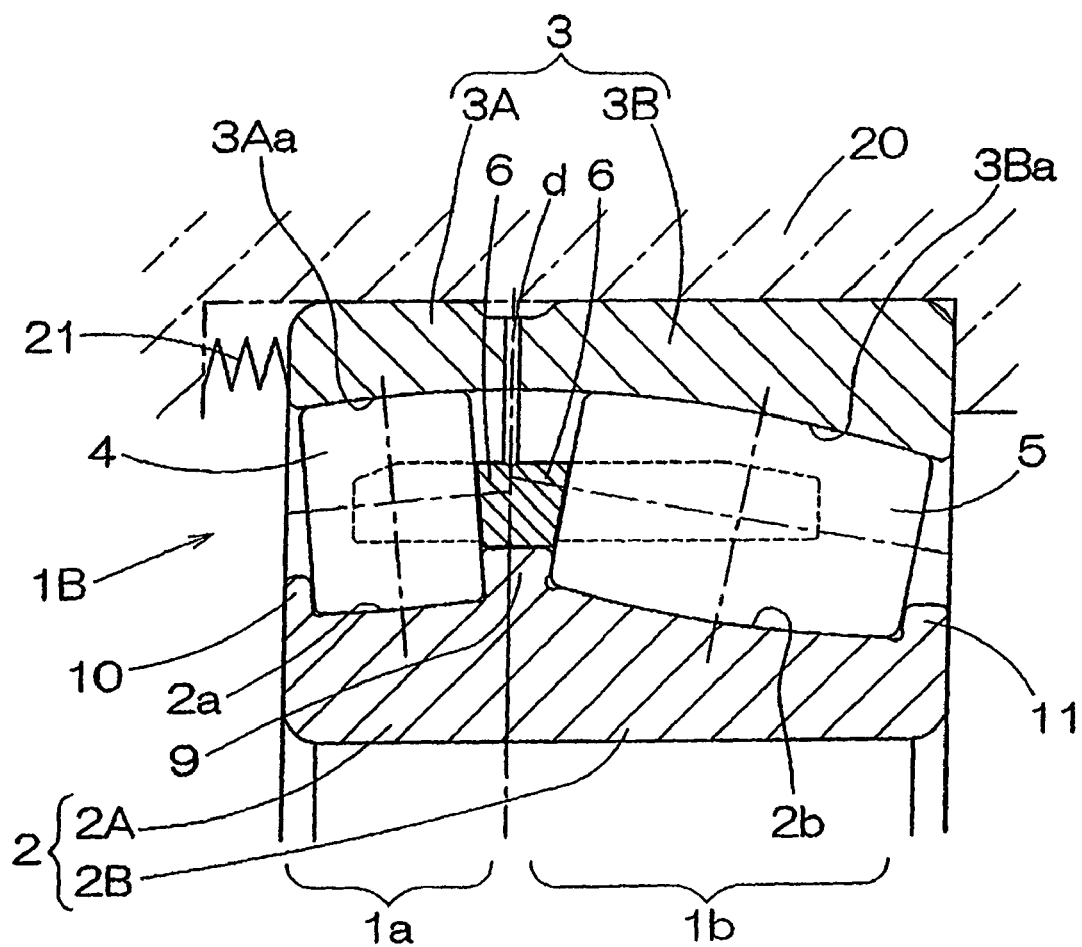
FIG. 3 is a fragmentary longitudinal sectional view of the double-row self-aligning roller bearing according to a third preferred embodiment of the present invention.

It is to be noted that the double-row self-aligning roller bearing of the structure according to the second embodiment can be modified as shown by 1B in FIG. 3. Specifically, the double-row self-aligning roller bearing 1B shown in FIG. 3 is modified in such a way that in addition to the splitting of the outer race 3, the inner race 2 is also divided into two split inner races 2A and 2B that are axially lined up. If the inner race 2 is so divided as described above, the inner race having left and right portions that are asymmetrical relative to each other can be manufactured easily.

Figure 4:
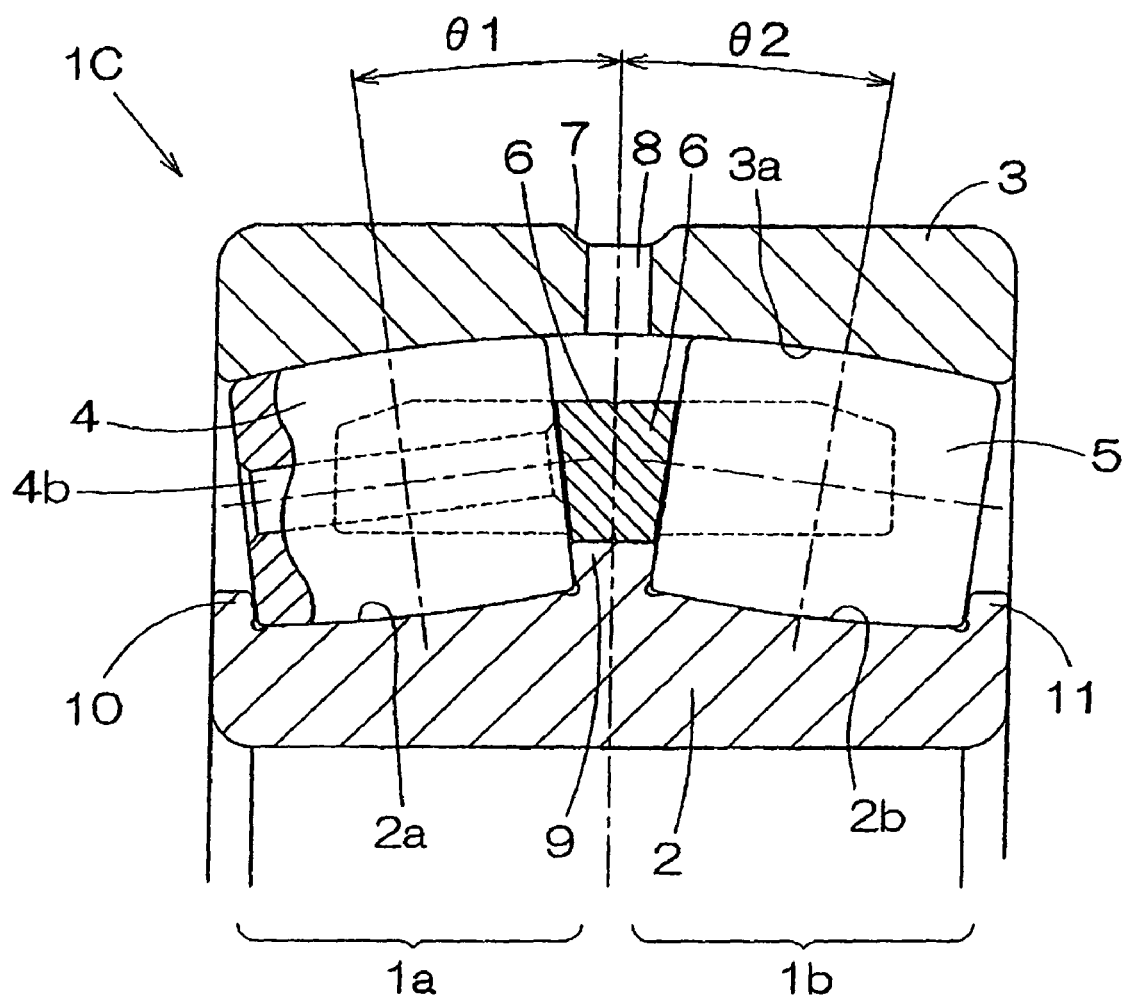
FIG. 4 is a fragmentary longitudinal sectional view of a modified form of the double-row self-aligning roller bearing according to the third embodiment of the present invention.

FIG. 4 illustrates a third preferred embodiment of the present invention. The double-row self-aligning roller bearing 1C shown in FIG. 4 is of a type, in which the roller row 4 makes use of axially hollowed rollers each having an axially extending hollow 4b defined therein. In this example, the left and right roller rows 4 and 5 have the respective contact angles θ1 and θ2, which are the same and make use of the rollers 4 and 5 of the same length and outer diameter. Other structural features of and effects afforded by the third embodiment described above are similar to those of the first embodiments.

In the case of the third embodiment, since the rollers 4 of the left roller row are employed in the form of an axially hollowed roller, the amount of material used to form the rollers 4 can be reduced. Also, even though the load acting on the row of the rollers 4 is small, the slippage of the rollers 4 can be lessened because the weight of each roller 4 is reduced, and hence the frictional wear and surface damage can be alleviated.

Figure 5:
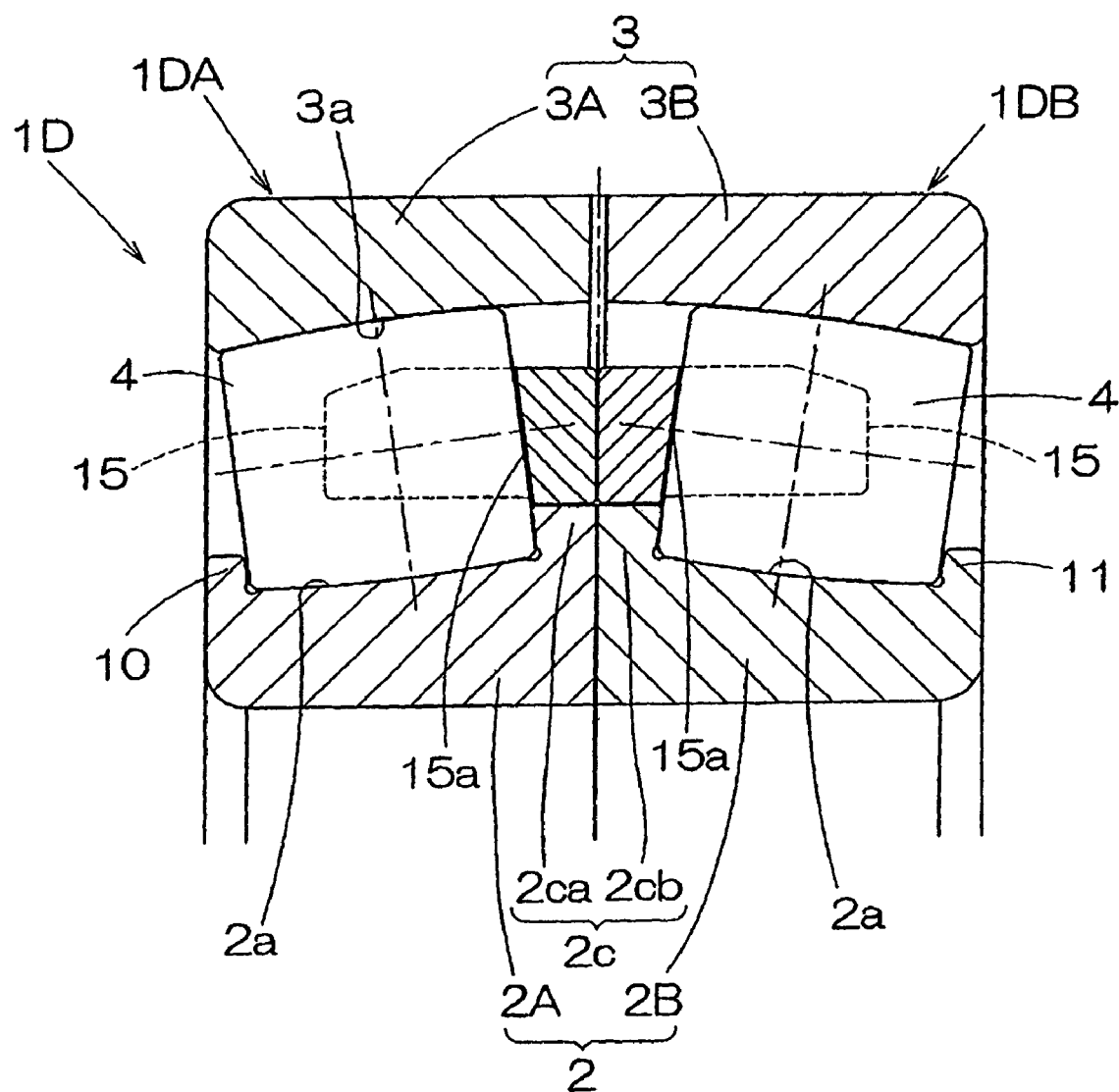
FIG. 5 is a fragmentary longitudinal sectional view of the double-row self-aligning roller bearing according to a fourth preferred embodiment of the present invention.
Figure 6:
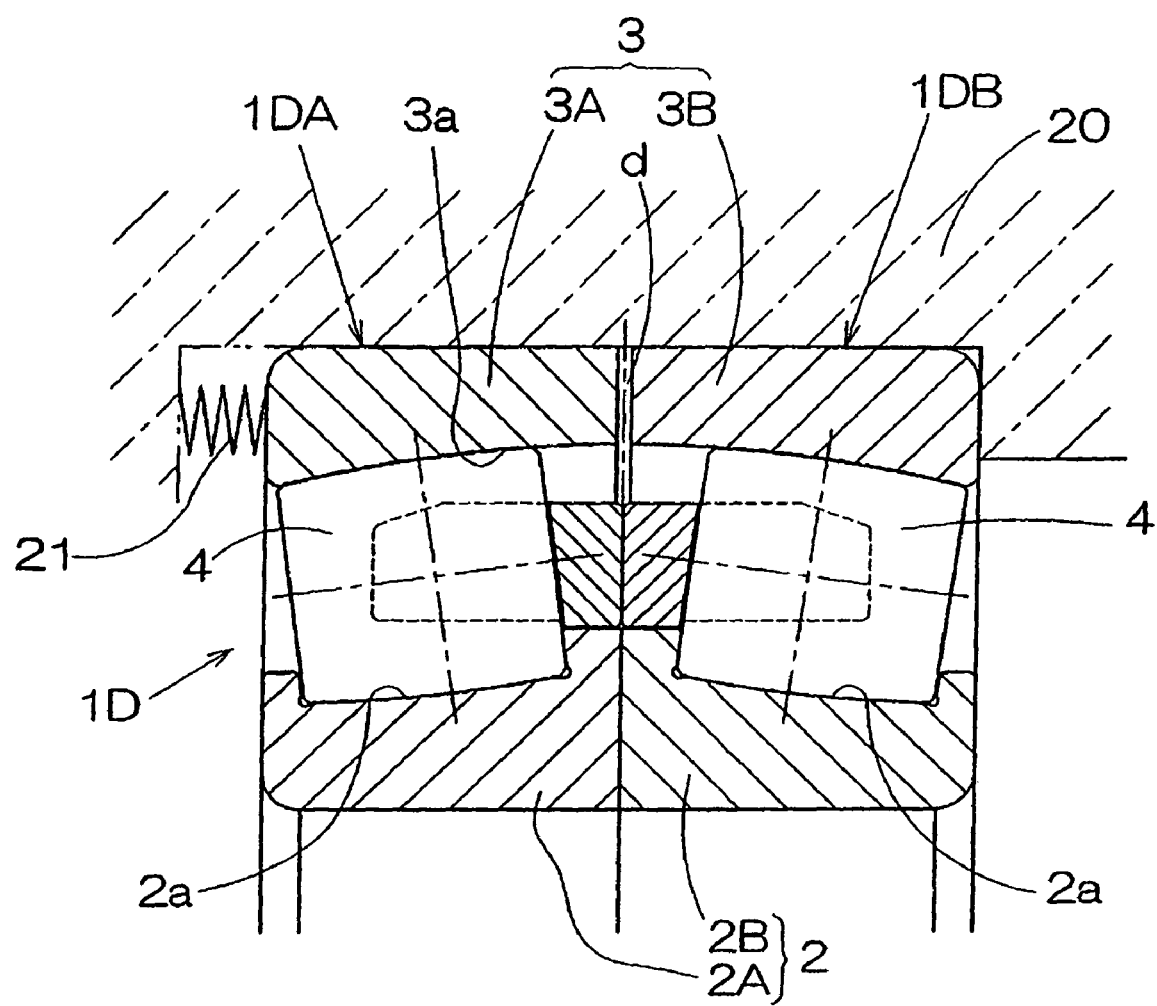
FIG. 6 is a fragmentary longitudinal sectional view of the double-row self-aligning roller bearing according to the fourth embodiment of the present invention, showing the manner of mounting of the bearing assembly.

A fourth preferred embodiment of the present invention will now be described with particular reference to FIGS. 5 and 6. The self-aligning roller bearing assembly 1D is a double-row self-aligning roller bearing, which is, in its entirety, divided into split bearing portions 1DA and 1DB that accommodate the left and right rows of the rollers 4 and 4, respectively, and that employ different elements associated with the load or the life, respectively.

This self-aligning roller bearing assembly 1D is a double-row self-aligning roller bearing of a structure, in which the rows of the rollers 4 are interposed between the inner and outer races 2 and 3 and the rollers 4 have an outer peripheral surface that is so shaped as to follow the raceway surface 3a in the outer race 3. The inner and outer races 2 and 3 are divided into left and right split inner races 2A and 2B and left and right split outer races 3A and 3B, respectively, and the split bearing portion 1DA includes the split inner race 2A, the split outer race 3A and the row of the rollers 4 while the split bearing portion 1DB includes the split inner race 2B, the split outer race 3B and the row of the rollers 4. The rollers 4 of each row is accommodated within respective pockets 15a defined in an annular roller retainer 15 provided in each of the split bearing portions 1DA and 1DB. The inner race 2 has opposite ends and an intermediate portion between the rows of the rollers 4, which are formed with radially outwardly extending collars 2b and 2c, and the intermediate collar 2c is divided into and, hence, comprised of two split collars 2ca and 2cb belonging respectively to the split inner races 2A and 2B.

In the illustrated embodiment, the dimension and shape of the left split bearing portion 1DA are the same as the dimension and shape of the right split bearing portion 1DB. The elements associated with the load or the life, which are different between the left and right split bearing portions 1DA and 1DB, include the material, the surface reforming treatment and/or the surface roughness, and at least one or a plurality of them differ between the left and right split bearing portions 1DA and 1DB.

Where the material, the surface reforming treatment and/or the surface roughness employed in the left split bearing portion 1DA are different from the material, the surface reforming treatment and/or the surface roughness employed in the right split bearing portion 1DB, the difference is embodied in at least one of the split inner races 2A and 2B, the split outer races 3A and 3B and the rollers 4. With respect to the surface reforming treatment and the surface roughness, the different surface treatments or the different surface roughness are employed in connection with the raceway surfaces 2a and 3a in the case of the split inner races 2A and 2B and the split outer races 3A and 3B, but in connection with rolling surfaces, i.e., the outer surfaces in the case of the rollers 4. Any combination of sites, where the different elements are to be employed, can be selected as desired and, for example, the split inner races 2A and 2B and the split outer races 3A and 3B may be made of different materials, treated with the different surface reforming treatments and/or have the different surface roughness while the left and right rows of the rollers 4 remain the same as to any of those elements, or all of the inner races 2A and 2B, the split outer races 3A and 3B and the rollers 4 may be made of different materials, treated with the different surface reforming treatments and/or have the different surface roughness.

Where the different materials are employed, an inexpensive material of a kind generally employed in bearings, for example, high carbon chrome steel (SUJ material according to the JIS (Japan Industrial Standards)) is employed for a low load side. On the other hand, material having a hardness or a rolling fatigue life that is higher or longer than that used for the low load side is employed for a heavy load side. Where the low load side employs the high carbon chrome steel, high cleanness steel (VP material), high speed steel (M50 material) or any of the following steels (1) and (2), for example, can be used for the heavy load side. Those material can be applied to any of the inner race 2, the outer race 3 and the rollers 4.

The steel materials (1) and (2) referred to above are both disclosed in the Japanese Laid-open Patent Publication No. 2000-204444 and have an excellent rolling fatigue life under the environment containing foreign matter and also under the environment of elevated temperatures.

The steel material (1) is of a composition containing, when the content of alloying elements is expressed in terms of percent by mass, C within the range of 0.6 to 1.3%, Si within the range of 0.3 to 3.0, Mn within the range of 0.2 to 1.5%, P in a quantity not greater than 0.03%, S in a quantity not greater than 0.03%, Cr within the range of 0.3 to 5.0%, Ni within the range of 0.1 to 3.0%, Al in a quantity not greater than 0.050%, Ti in a quantity not greater than 0.003%, O in a quantity not greater than 0.0015% and N in a quantity not greater than 0.015%, the remainder being Fe and unavoidable impurities. This steel material (1) has a structure which is tempered after having been hardened or carbonitrided, and has a hardness of HRC 50 or higher after having been tempered, in which carbide has a maximum particle size of preferably not greater than 8 μm. The steel material (1) may additionally contain at least one of Mo within the range of 0.05 to 0.25 mass % and V within the range of 0.05 to 1.0 mass %.

The steel material (2) is of a composition containing, when the contents of alloying elements are expressed in terms of percent by mass, C within the range of 0.6 to 1.3%, Si within the range of 0.3 to 3.0, Mn within the range of 0.2 to 1.5%, P in a quantity not greater than 0.03%, S in a quantity not greater than 0.03%, Cr within the range of 0.3 to 5.0%, Ni within the range of 0.1 to 3.0%, Al in a quantity not greater than 0.050%, Ti in a quantity not greater than 0.003%, O in a quantity not greater than 0.0015% and N in a quantity not greater than 0.015%, the remainder being Fe. This steel material (2) has a structure which is tempered after having been hardened or carbonitrided, and has a hardness of HRC 58 or higher after having been tempered, in which carbide has a maximum particle size of preferably not greater than 8 μm.

Where the different surface reforming treatment is employed, a heat treatment such as standard hardening is carried on the light load side, or no particular surface treatment is applied to the light load side. On the other hand, the surface reforming treatment is effected to the heavy load side in order to increase the surface hardness to a value higher than that on the light load side. As a process for increasing the surface hardness, any of the nitriding treatment, the shot peening treatment and the diamond carbon treatment (DLC treatment) can be employed. Although the shot peening treatment is carried out after the heat treatment, the hardness can be increased when a compressive residue stress is imparted.

Where the different surface roughness is employed, the surface hardness on the light load side is within the range of Ra 0.2 to 0.25 and that on the heavy load side is not higher than Ra 0.16, preferably not higher than Ra 0.10, or more preferably not higher than Ra 0.05. It may be within the range of about Ra 0.1 to 0.13 or within the range of about Ra 0.13 to 0.16. The range of this surface roughness can be applied to any one of the raceway surfaces of the split inner and outer races 2B and 3B and the rolling surfaces of the rollers 4 on the heavy load side. If the surface roughness is minimized, the machining process for minimizing the surface roughness would require a substantial amount of labor, but the lubricity will improve and the durability will increase.

The split outer races 3A and 3B are so disposed as to form a gap d therebetween when held in a natural condition, that is, in a condition in which they have corresponding spherical raceway surfaces 3a of the split outer races 3A and 3B occupying respective portions of the same spherical shape. While this double-row self-aligning roller bearing 1D is installed inside a bearing housing 20 as shown in FIG. 6, the split outer races 3A and 3B are axially fastened together by the effect of a preload applied by a preload applying member 21 so as to reduce the gap d between the split outer races 3A and 3B. The preload applying member 21 may be employed in the form of, for example, a spring member or a fastening screw. Where the spring member is employed for the preload applying member 21, a compression spring, for example, may be employed and may be arranged at a plurality of locations circumferentially of the bearing assembly in contact with one end of the outer race 3. It is preferred that the preload applying member 21 is so disposed as to apply the preload to one of the split outer races, for example, the split outer race 3A on the light load side. When the preload is applied in this way, the slippage of the rollers 4 can be positively suppressed.

In the double-row self-aligning roller bearing 1D according to the fourth embodiment, since the split bearing portions 1DA and 1DB accommodating the left and right roller rows, respectively, utilize different elements, all associated with the load or the bearing life, as described above, the left and right bearing portions 1DA and 1DB can accommodate the load appropriately, particularly where the bearing assembly is used in the application where uneven loads act on the left and right bearing portions. Accordingly, it is possible to avoid any undesirable waste in, for example, material, reforming treatment and processing on the light load side, which would otherwise occur as a result of an excessive increase of the latitude of the rated life and the load carrying capacity. Since the bearing assembly 1D is divided into the left and right bearing portions 1DA and 1DB, it can easily be accomplished to design the left and right bearing portions to have the elements, associated with the load or the life, that are different from each other. Also, since it is sufficient for the use of a special material, the surface reforming treatment and/or the process to increase the surface roughness to be applied only to the split bearing portion 1DB on the heavy load side, the cost of manufacture can be reduced as compared with the case in which the use of a special material, the surface reforming treatment and/or the process to increase the surface roughness are applied to the bearing assembly 1D in its entirety. In particular, where application is made to the support of the main shaft of the wind power generator as will be described later, the support appropriate to the characteristic acting on the main shaft from the wind can be accomplished, resulting in enhanced effect of increasing the substantial life.

Figure 7:
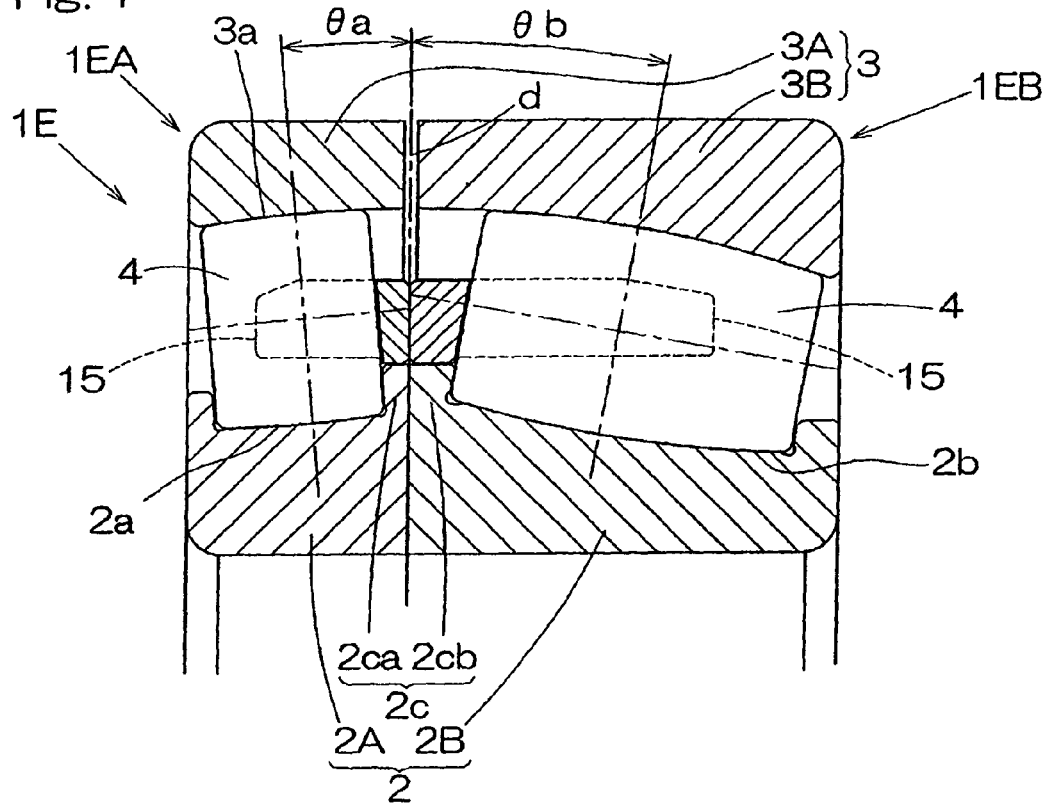
FIG. 7 is a fragmentary longitudinal sectional view of the double-row self-aligning roller bearing according to a fifth preferred embodiment of the present invention.

FIG. 7 illustrates a fifth preferred embodiment. In a double-row self-aligning roller bearing 1E according to this fifth embodiment, one of the elements associated with the load or the life, which is employed distinctly in the split bearing portions 1EA and 1EB accommodating, respectively, the left and right roller rows, is chosen to be the axial dimension of the left and right split bearing portions 1EA and 1EB and the axial dimension of the rollers 4. In this illustrated embodiment, the axial width of each of the split inner race 2B and the split outer race 3B on the heavy load side is chosen to be greater than that of each of the split inner race 2A and the split outer race 3A on the light load side and, at the same time, the rollers 4 on the heavy load side have a length greater than that of the rollers 4 on the light load side. Consequent upon this design, the respective contact angles θa and θb in the split bearing portions 1EA and 1EB accommodating the left and right roller rows, respectively, are different from each other. In such case, the contact angle θb in the split bearing portion 1EB accommodating the row of the longer rollers 4 is set to a value greater than the contact angle θa of the split bearing portion 1EA accommodating the row of the shorter rollers 4. The rollers 4 of the left and right rows have the same maximum outer diameter. The rollers 4 of the left and right rows may have an outer diameter different from each other. By way of example, the longer rollers 4 may have an outer diameter greater than that of the shorter rollers 4.

With respect to the material, the surface reforming treatment and the surface roughness of the left and right split bearing portions 1EA and 1EB, they may be the same, or the split bearing portion 1EB on the heavy load side may be rendered to be better than the split bearing portion 1EA on the light load side as is the case with the previously described embodiment. Other structural features of this fifth embodiment are similar to those of the fourth embodiment.

In the case of this fifth embodiment, since the rollers 4 of one row in the split bearing portion 1EB have a longer length and a greater contact angle θb, the load carrying capacity to support the thrust load can be increased and the rolling fatigue life can also be increased. On the other hand, the rollers 4 of the opposite row have a shorter length and a smaller contact angle θa, the contact stress between the rollers 4 and the raceway surfaces 2a and 3a can be increased and the rollers 4 can have a reduced weight, resulting in alleviation of the slippage. For this reason, even under the light load, slippage hardly occurs in the rollers 4 and surface damage occurs hardly. In view of those functional features taken into consideration, the life of the double-row self-aligning roller bearing 1E that is utilized to support, for example, the main shaft of the wind power generator can increase. Where the different material, surface reforming treatment or surface roughness is employed in the left and right split bearing portions 1EA and 1EB in the manner as hereinbefore described, the substantial life of the double-row self-aligning roller bearing 1E can be further increased.

Also, since the double-row self-aligning roller bearing 1E is so structured and so configured as to be divided into the two split bearing portions 1EA and 1EB, the double-row self-aligning roller bearing 1E having left and right bearing portions that are asymmetrical relative to each other can be manufactured easily. Also, since it is satisfactory to allow only the split bearing portion 1EB on the heavy load side to have the longer rollers, no waste of the material to form the roller occur and the cost can be reduced, as compared with the case in which the bearing assembly in its entirety is made to have an increased size.

Figure 8:
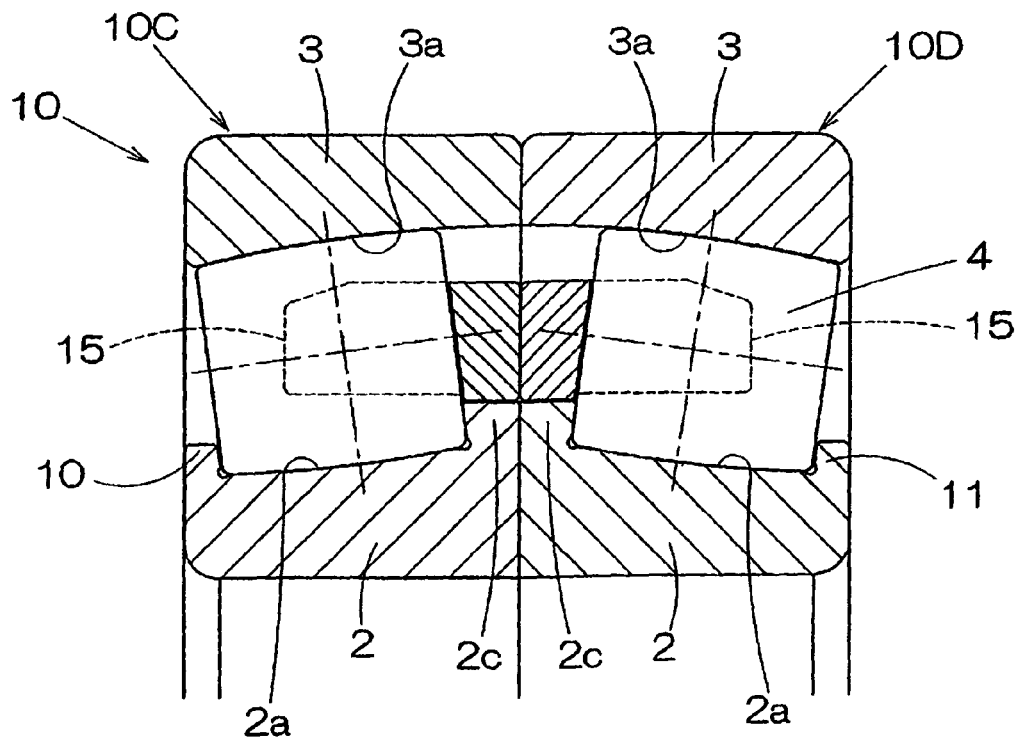
FIG. 8 is a fragmentary longitudinal sectional view of a modified form of the double-row self-aligning roller bearing according to the fifth embodiment of the present invention.
Figure 9:
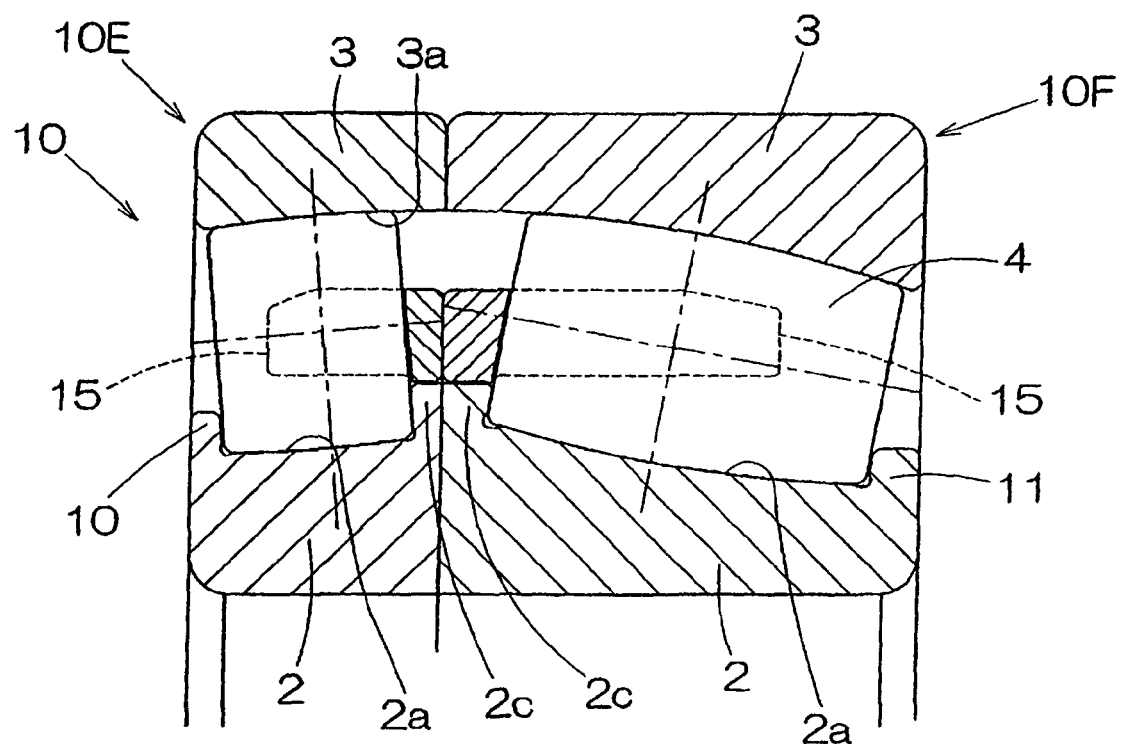
FIG. 9 is a fragmentary longitudinal sectional view of a further modified form of the double-row self-aligning roller bearing according to the fifth embodiment of the present invention.

It is to be noted that although in any one of the fourth and fifth embodiments, the double-row self-aligning roller bearings 1D and 1E have been shown and described as having the divided construction, two single-row self-aligning roller bearings 10C and 10D may be axially juxtaposed to provide a combination double-row self-aligning roller bearing 10 as shown in FIG. 8 or FIG. 9. In this case, the singe row self-aligning roller bearings 10C and 10D are to be designed so as to have the elements associated with the load or the life, which are different from each other. The respective raceway surfaces 3a of the outer races 3 on both sides lie in the same spherical plane.

In the first modification shown in FIG. 8, the single-row self-aligning roller bearings 10C and 10D have the same size, but make use of the different material, surface reforming treatment and/or surface roughness. The manner of how the material, surface reforming treatment and/or surface roughness are differentiated is similar to that described in connection with the fourth embodiment with reference to FIGS. 5 and 6.

In the second modification shown in FIG. 9, the single-row self-aligning roller bearings 10C and 10D make use of the respective inner and outer races 2 and 3 of different axial dimensions and, also, the rollers of different axial dimensions.

Even where, as is the case with any of the first and second modifications discussed above, the two single-row self-aligning roller bearings, that operate independently, are axially juxtaposed and those two single-row self-aligning roller bearings 10C and 10D, or 10E and 10F, make use of the different elements associated with the load or the life, such effects can be obtained that the bearings 10C and 10D or 10E and 10F can accommodate the load that are uneven on the left and right roller rows, the substantial life can be increased and no waste of material occur, rendering it to be economical. Surface damage can be also alleviated.

The double-row self-aligning roller bearing according to a sixth preferred embodiment of the present invention will now be described in detail with particular reference to FIGS. 10 and 11.

Figure 10:
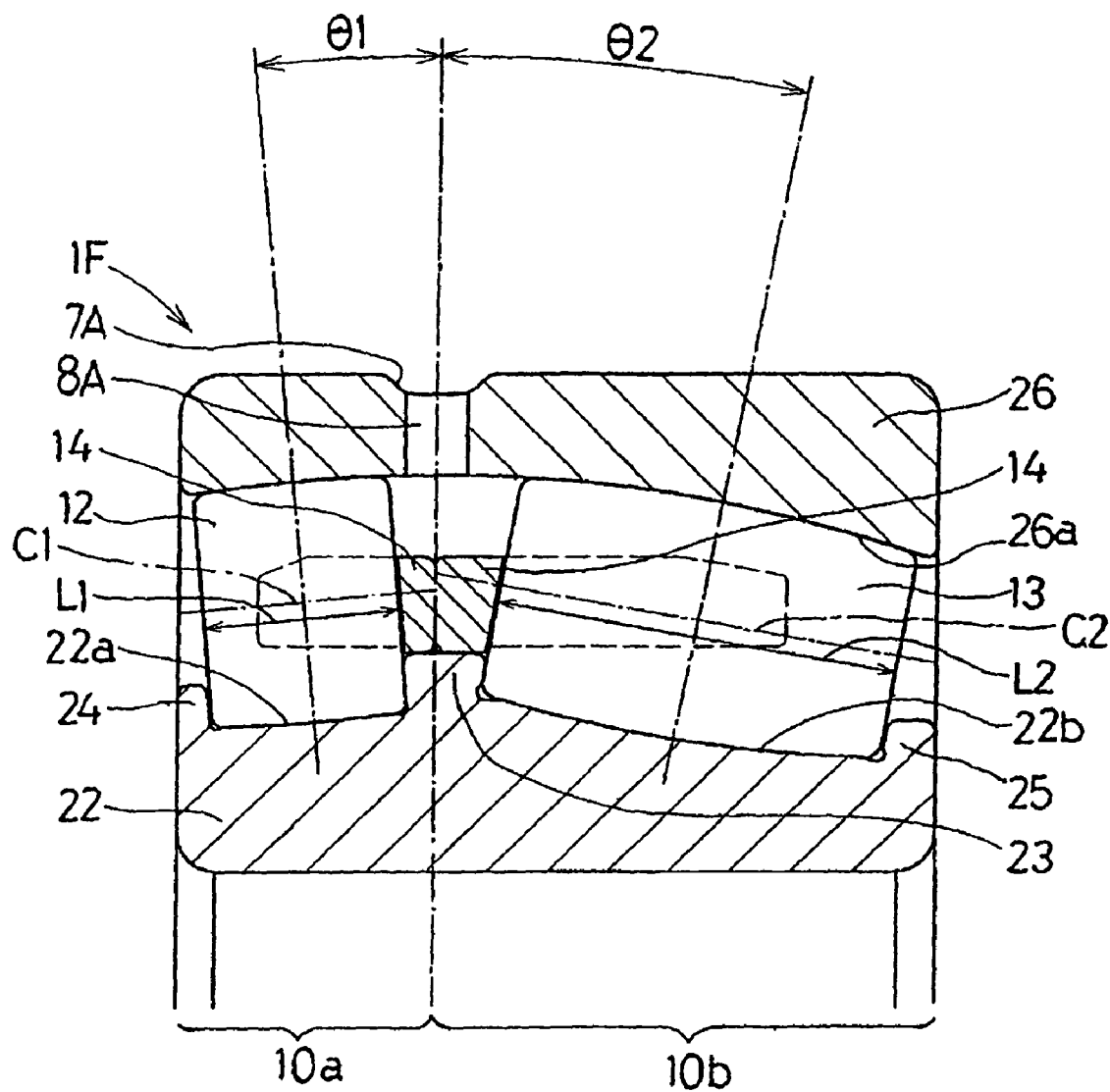
FIG. 10 is a fragmentary longitudinal sectional view of the double-row self-aligning roller bearing according to a sixth preferred embodiment of the present invention.
Figure 11:
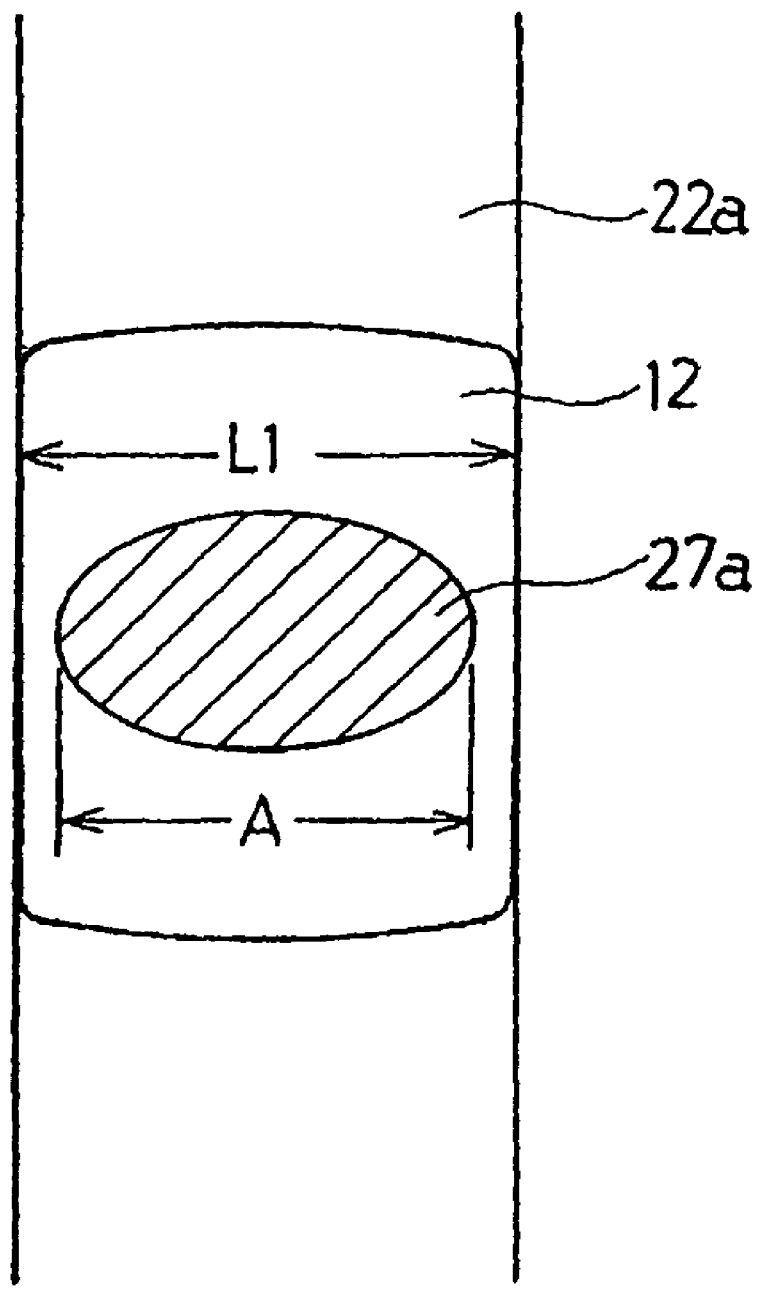
FIG. 11 schematically illustrates the contact ellipse depicted in a contact plane between the spherical rollers, having a smaller length, and the raceway surface of an inner race.

The double-row self-aligning roller bearing 1F in FIGS. 10 and 11 includes an inner race 22, an outer race 26, double rows of spherical rollers 12 and 13 interposed between a raceway surface in the inner race 22 and a raceway surface in the outer race 26, and roller retainers 14 for retaining the rows of the rollers 12 and 13, respectively. The roller retainers 14 are employed one for each of the roller rows. The raceway surface 26a in the outer race 26 is so shaped as to represent a spherical shape, and each of the rollers 12 and 13 has an outer peripheral surface following the spherical shape of the raceway surface 26a of the outer race 26.

The outer race 26 has an oil groove 7A defined in an outer peripheral surface thereof at a location generally intermediate of the length thereof and also has an oil passage 8A defined therein so as to extend from the oil groove 7 and open at an inner peripheral surface thereof. The oil passage 8A is defined at one location or a plurality of circumferentially spaced locations of the outer race 26.

The inner race 22 in the illustrated embodiment has radially outwardly extending outer collars 24 and 25, defined in opposite ends of the inner race 22, and an intermediate collar 23 defined at a location generally intermediate thereof. As a different embodiment, the inner race may be employed in the form of a collarless inner race. This inner race 22 has an outer peripheral surface formed with two axially spaced raceway surfaces 22a and 22b that are defined therein so as to follow the respective curvatures of the outer peripheral surfaces of the rollers 12 and 13.

With respect to the length of the rollers as measured along the longitudinal axes C1 and C2 of the left and right rows of the rollers 12 and 13, the rollers 13 of the right row has a length L2 chosen to be greater than the length L1 of the rollers 12 of the left row. Also, in the illustrated embodiment, bearing portions 10a and 10b for the left and right roller rows, respectively, have different contact angles θ1 and θ2, respectively. In such case, the contact angle θ2 in the bearing portion 10b accommodating the row of the longer rollers 13 is chosen to be greater than the contact angle θ1 in the bearing portion 10a accommodating the row of the shorter rollers 12.

The rollers 12 and 13 of the left and right rows have, for example, the same maximum outer diameter. As a modification of this embodiment, the rollers 12 and 13 of the left and right rows may have respective outer diameters different from each other. By way of example, the longer rollers 13 may have an outer diameter greater than that of the smaller rollers 12. With respect to the shape of the rollers 12 and 13 of the left and right roller rows, it may be in the form of either symmetrical rollers, in which the position of the rollers that aligns with the maximum diameter occupies a position intermediate to the length of the rollers, or asymmetrical rollers, in which the position of the rollers that aligns with the maximum diameter is displaced from the position intermediate to the length of the rollers.

FIG. 11 schematically illustrates the condition, in which the roller 12 having the smaller length L1 is positioned on the raceway surface 22a of the inner race 22. When the rollers 12 and the raceway surface 22a of the inner race receive the load, the contact plane therebetween deforms elastically, resulting in a round contact plane around the point of contact, that is, a contact ellipse 27a. Although not shown, a similar contact ellipse is formed in a contact plane between the rollers 13 and the raceway surface 26a of the outer race 26. The length L1 of the rollers 12 is chosen to be greater than the length of the major axis A of the contact ellipse 27a.

The double-row self-aligning roller bearing 1F of the above described construction is used in the field of application, in which uneven loads tend to act on the left and right rows of the rollers, for example, in which one of the roller rows supports both of the thrust load and the radial load and the other of the roller rows mostly supports only the radial load. In such case, the longer rollers 13 are employed in a high load side row, which supports the thrust and radial load and, on the other hand, the shorter rollers 12 are employed in a light load side row, which supports only the radial load.

As hereinabove described, since the longer rollers 13 are arranged in the high load side row and the shorter rollers 12 are arranged in the light load side row, the longer rollers 13 and the shorter rollers 12 can appropriately accommodate loads imposed on them. In other words, since the load carrying capacity of the high load side row is increased, the rolling fatigue life can increase. Also, the contact stress between the shorter rollers 12 and the raceway surfaces 26a and 22a increased in the light load side row and the weight of the rollers decreases and, therefore, slippage can be alleviated.

Also, since the length L1 of the shorter rollers 12 is greater than the length of the major axis A of the contact eclipse 27a, the shorter roller 12 can sufficiently withstand against the radial load during use.

FIG. 12 shows diagrams used to explain the relation, in the double-row self-aligning roller bearing according to a seventh preferred embodiment of the present invention, between each row of rollers, and the raceway surface defined in the inner race in contact with the rollers. In particular, FIG. 12A schematically illustrates a condition in which the spherical rollers are held in contact with the raceway surfaces of the inner race, FIG. 12B illustrates a contact ellipse defined at a point of contact of the rollers with the raceway surfaces of the inner race, and FIG. 12C illustrates a pattern of distribution of loads at opposite ends of the rollers.

Figure 12A:
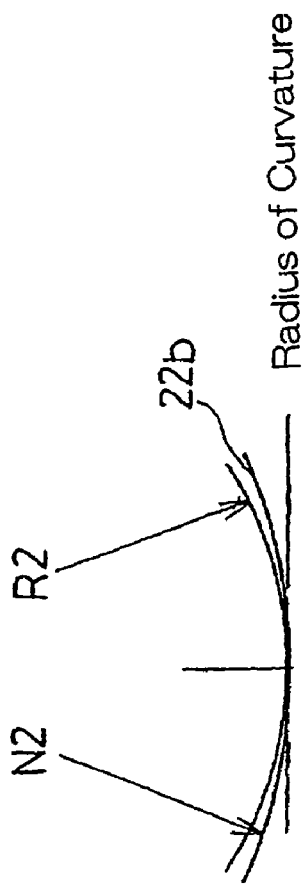
FIGS. 12A to 12C show explanatory diagrams used to explain the relation between each row of spherical rollers, employed in the double-row self-aligning roller bearing according to a seventh preferred embodiment of the present invention, and the raceway surface defined in the inner race, in which FIG. 12A schematically illustrates a condition in which the spherical rollers are held in contact with the raceway surfaces of the inner race.
Figure 12A:
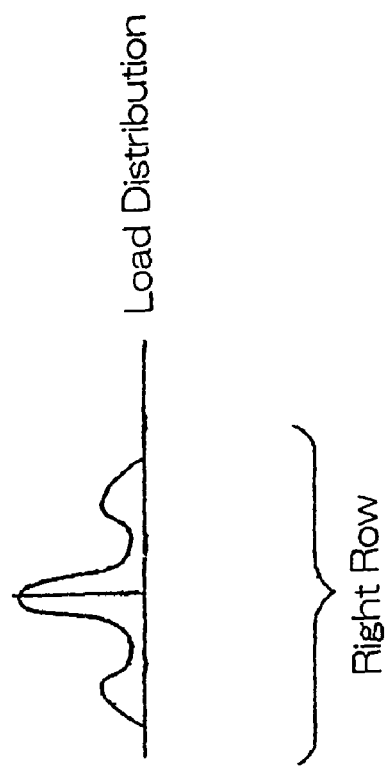

As shown in FIG. 12A, assuming that the radius of curvature of the ridge of the shorter rollers 12 of the left row, that is, the radius of the contour line of the section containing the longitudinal axes C1 and C2 is expressed by R1, the radius of curvature of the ridge of the longer rollers 13 of the right row is expressed by R2, the radius of curvature of the raceway surface 22a of the inner race for the left roller row is expressed by N1, and the radius of curvature of the raceway surface 22b of the inner race for the right roller row is expressed by N2, arrangement is made to establish the following dimensional relationship. The ridge of each of the rollers 12 and 13 is intended to mean the contour line appearing in the section containing the respective longitudinal axis C1 and C2 of the spherical surfaces of the rollers 12 and 13.

$$N1/R1 < N2/R2$$

In order to obtain the above dimensional relationship, any of the following designs has to be chosen.

(1) To render the radii of curvature of the respective ridges of the rollers 12 and 13 of the left and right rows to be different from each other. In the illustrated embodiment, the radius of curvature R1 of the shorter rollers 12 of the left row is chosen to be greater than the radius of curvature R2 of the longer rollers 13 of the right row.

(2) To render the radii of curvature of the respective raceway surfaces 22a and 22b of the inner race for the left and right roller rows to be different from each other. In the illustrated embodiment, the radius of curvature of the raceway surface 22b for the right roller row is chosen to be greater than the radius of curvature of the raceway surface 22a for the left roller row.

(3) To use the combination of (1) and (2) above.

When the rollers and the raceway surfaces of the inner race receive the load, the contact plane deforms elastically. This elliptical contact plane represents the contact ellipse. If the ratio N/R between the radius of curvature N of the raceway surface of the inner race and the radius of curvature R of the ridge of each roller is relatively small enough to approach 1, the contact ellipse will have an increased size during the operation, but if the ratio N/R is relatively large, the contact ellipse will have a reduced size during the operation.

Figure 12B:
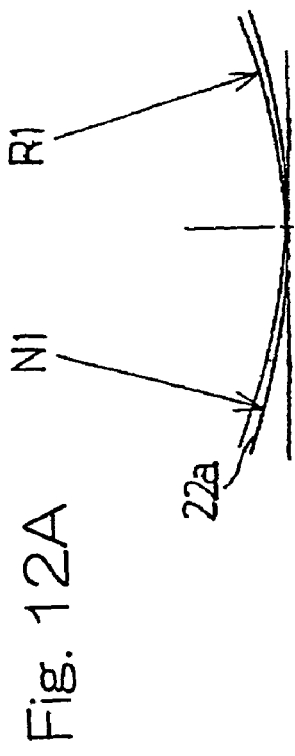
Figure 12B:
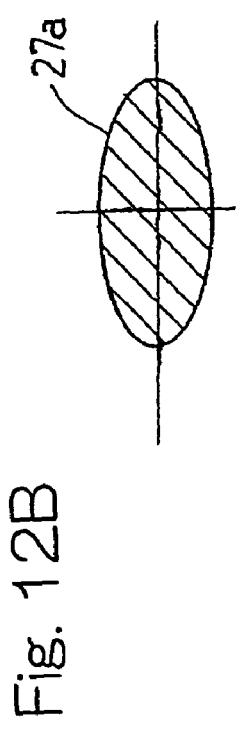

Accordingly, as shown in FIG. 12B, the size of the contact ellipse 27a generated at a point of contact between the longer rollers 13 of the right row and the raceway surface 22b of the inner race for the right roller row will become relatively small. As the contact ellipse 27a becomes small, the edge load at the opposite ends of each roller 13 decreases as shown in the pattern of distribution of the bearing pressure in FIG. 12C.

Figure 12C:
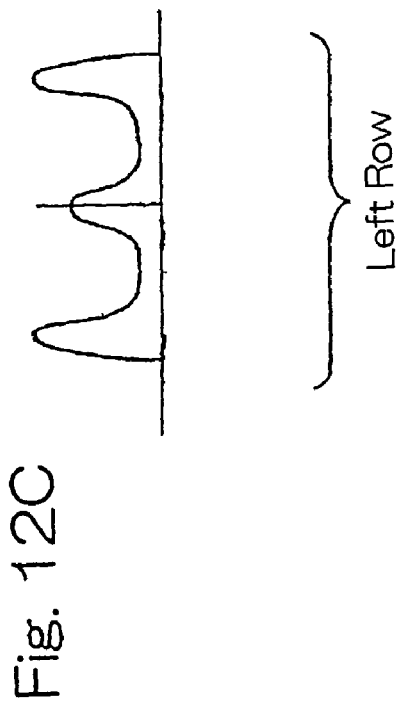

On the other hand, the size of the contact ellipse 27a generated at a point of contact between the shorter rollers 12 of the left row and the raceway surface 22a of the inner race for the left roller row will become relatively large. As the contact ellipse 27a becomes large, the driving force transmitted from the inner race increases and, therefore, the rollers can be easily stabilized. Also, since a portion which serves as an axis of rotation for the skew is large, the skew can be suppressed by the effect of the frictional resistance. As shown in FIG. 12C, although the edge stress increases, the loaded load becomes so small that no problem will occur.

The double-row self-aligning roller bearing 1F of the above described construction is used in the field of application, in which uneven loads tend to act on the left and right roller rows, for example, in which one of the roller rows supports both of the thrust load and the radial load and the other of the roller rows mostly supports only the radial load. In such case, the longer rollers 13 are employed in the high load side row, which supports the thrust and radial load and, on the other hand, the shorter rollers 12 are employed in the light load side row, which supports only the radial load.

As hereinabove described, since the longer rollers 13 are arranged in the high load side row and the shorter rollers 12 are arranged in the light load side row, the left and right roller rows can appropriately accommodate loads, depending on the condition of load on each of those roller rows. In other words, since the load carrying capacity of the high load side row is increased, the rolling fatigue life can increase. Also, the surface area of contact between the shorter rollers 12 and the raceway surfaces 26a and 22a is increased in the light load side row and the weight of the rollers 12 decreases and, therefore, slippage can be alleviated.

Also, in order to reduce the edge stress in the roller row of the longer rollers 13 on the high load side, the ratio N2/R2 between the radius of curvature N2 of the raceway surface 22b of the inner race and the radius of curvature R2 of the ridge of the rollers 13 is chosen to be relatively large to reduce the size of the contact ellipse and, therefore, it can be expected that the life of the rollers of the roller row on the high load side can further increase. With respect to the shorter rollers of the roller row on the light load side, the ratio N1/R1 between the radius of curvature N1 of the raceway surface 22a of the inner race and the radius of curvature R1 of the ridge of the rollers 12 is chosen to be relatively small to increase the size of the contact ellipse to thereby increase the frictional resistance relative to the skew and, therefore, the skew can be effectively suppressed.

The present invention can be advantageously employed in the double-row self-aligning roller bearing, in which the uneven load tends to act on the left and right roller rows, and the main shaft support structure for the wind power generator utilizing such bearing assembly.

Figure 13:
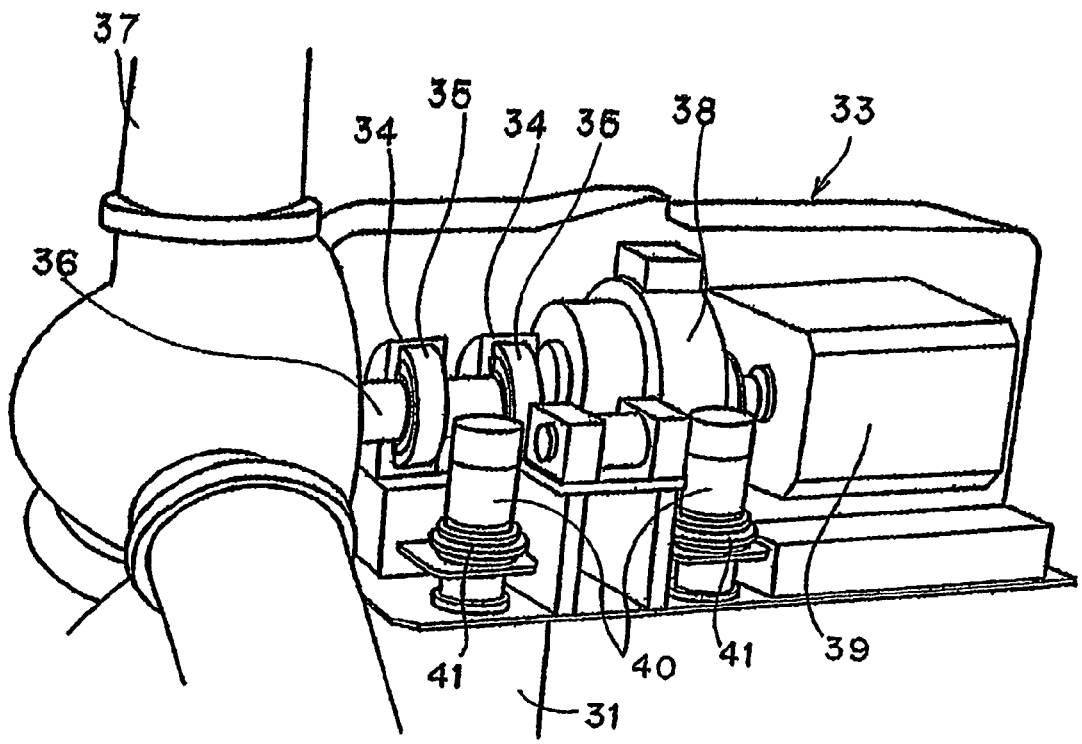
FIG. 13 is a perspective view, with a portion cut out, of a main shaft support structure for a wind power generator, which utilizes the double-row self-aligning roller bearing according to any one of the first to seventh embodiment of the present invention.
Figure 14:
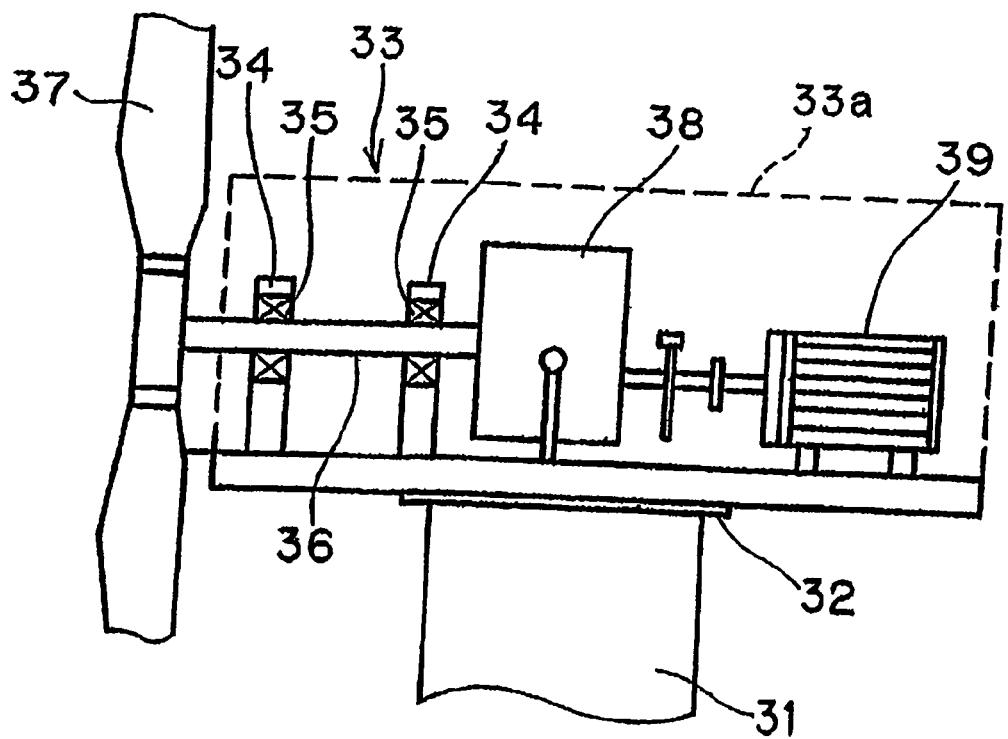
FIG. 14 is a side view of the main shaft support structure for the wind power generator, with a nacelle thereof shown by the phantom line.

FIGS. 13 and 14 illustrate an example of the main shaft support structure of the wind power generator utilizing the double-row self-aligning roller bearing according to any one of the first to seventh embodiments of the present invention. A casing 33a forming a part of a nacelle 33 is mounted on a support tower 31 through a turret bearing 32 (FIG. 14) for swiveling motion in a horizontal plane. The casing 33a of the nacelle 33 accommodates therein a main shaft 36 rotatably through main shaft support bearings 35 installed inside a bearing housing 34. A blade rotor 37 defining a swivel blade assembly is mounted on a portion of the main shaft 36, which protrudes outwardly from the casing 33a, for rotation together therewith. The opposite end of the main shaft 36 is drivingly coupled with a speed-up gear unit 38 having an output shaft that is in turn coupled with a rotor shaft of an electric power generator 39. The nacelle 33 can be swiveled to any desired angle by a swiveling motor 40 through a reduction gear unit 41.

Although in the illustrated embodiment, the two main shaft support bearings 35 are shown as employed, one of those support bearings 35 may be dispensed with. For each of those main shaft support bearings 35, the double-row self-aligning roller bearing 1, 1A, 1B, 1C, 1D, 1E or 1F of the structure shown and described in connection with any one of the first to seventh embodiments is employed. In such case, since the rollers of the row remote from the blade rotor 37 tend to receive a high load, the row of the longer rollers are employed. On the other hand, since the radial load mainly acts on the rollers of the row close to the blade roller 37, the row of the shorter rollers are employed.

Since during the calm condition, in which the blade rotor of the wind power generator stands still, a large radial load acts on the bearing 35, the rollers of the row positioned adjacent to the blade rotor 37 have a length greater than the length of the major axis of the contact ellipse generated in the plane of contact between those rollers and the raceway member so that the bearing 35 can withstand against this large radial load.

Also, as shown in FIG. 12, assuming that the radius of curvature of the ridge of the rollers of the row positioned adjacent to the blade rotor 37 is expressed by R1, the radius of curvature of the ridge of the rollers of the row remote from the blade rotor 37 is expressed by R2, the radius of curvature of the raceway surface of the inner race for the roller row positioned adjacent to the blade rotor 37 is expressed by N1, and the radius of curvature of the raceway surface of the inner race for the roller row remote from the blade rotor 37 is expressed by N2, arrangement is made to establish the following dimensional relationship.

$$N1/R1 < N2/R2$$

It is to be noted that although in the illustrated embodiment the rollers of the left row and the rollers of the right row have been shown and described as having respective lengths different from each other, they may have the same length.

The present invention can be advantageously employed in the double-row self-aligning roller bearing, in which the uneven load tends to act on the left and right roller rows, and the main shaft support structure for the wind power generator utilizing such bearing assembly.

When the double-row self-aligning roller bearing 1, 1A, 1B, 1C, 1D, 1E or 1F of the structure shown and described in connection with any one of the first to seventh embodiments is employed for the main shaft support bearing 35 employed in the wind power generator as described above, the roller row remote from the blade rotor 37 defines a roller row which receives a thrust load. For this reason, the double-row self-aligning roller bearing 1, 1A, 1B or 1E is so arranged as to permit the row of the rollers of a large length to be employed in this thrust load bearing roller row. Where the double-row self-aligning roller bearing 1C of the structure shown in and described with reference to FIG. 4 in connection with the third embodiment, the row of the axially solid rollers 5 are employed in the thrust load bearing roller row.

As described above, when the double-row self-aligning roller bearing 1D, for example, is employed for the main shaft support bearing 35, the roller row remote from the blade rotor 37 serves as the thrust load bearing roller row. For this reason, the double-row self-aligning roller bearing 1D is arranged so that the split bearing portion 1DB having a high load capacity or an increased rated life can be employed in the thrust load bearing roller row.

It is to be noted that the combination row self-aligning roller bearing assembly, comprised of the two single-row self-aligning roller bearings 10C and 10D or 10E and 10F as shown in FIGS. 8 and 9 may be employed for the main shaft support bearing 35.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A double-row self-aligning roller bearing, which is used to support a main shaft of a wind power generator having a blade rotor mounted on the main shaft, comprising:
an inner race;
an outer race;
left and right rows of rollers arranged between the inner race and the outer race, in which left and right bearing portions accommodating the left and right roller rows have respective load carrying capacities different from each other,
wherein one of the bearing portions that is arranged remote from the blade rotor has a load carrying capacity higher than that of the other of the bearing portions that is arranged close to the blade rotor, and each of the rollers of the row in the bearing portion arranged remote from the blade rotor has a length greater than that of each of the rollers of the row in the bearing portion arranged close to the blade rotor.

2. The double-row self-aligning roller bearing as claimed in claim 1, wherein the rollers of the left row have at least one of the dimensions and shape that is different from that of the rollers of the right row.

3. The double-row self-aligning roller bearing as claimed in claim 1, wherein one of the left and right roller rows is comprised of axially hollowed rollers each having an axially extending hollow.

4. The double-row self-aligning roller bearing as claimed in claim 1, wherein the left and right bearing portions have respective contact angles different from each other.

5. The double-row self-aligning roller bearing as claimed in claim 1, wherein the outer race is divided into two axially juxtaposed split outer races.

6. The double-row self-aligning roller bearing as claimed in claim 5, wherein a gap is provided between the two split outer races and a preload is applied to those split outer races.

7. A main shaft support structure, comprising:
one or a plurality of bearings as defined in claim 1, disposed inside a housing.

8. The double-row self-aligning roller bearing as claimed in claim 1, in which assuming that the length of the rollers of the roller row arranged close to the blade rotor is expressed by L1, the length of the rollers of the roller row arranged remote from the blade rotor is expressed by L2, and the length of a major axis of a contact ellipse generated in a plane of contact between the rollers of one of the roller rows and the inner race is expressed by A, the following dimensional relationship establishes:

$$L1 < L2 \text{ and } L1 > A.$$

9. The double-row self-aligning roller bearing as claimed in claim 8, in which the rollers are symmetrical rollers having a maximum diameter positioned at a location intermediate of the length of the rollers.

10. The double-row self-aligning roller bearing as claimed in claim 8, in which the rollers are asymmetrical rollers having a maximum diameter positioned at a location displaced from a point intermediate of the length of the rollers.

11. The double-row self-aligning roller bearing as claimed in claim 1, in which assuming that the radius of curvature of a ridge of the rollers of one of the roller rows is expressed by R1, the radius of curvature of a ridge of the rollers of the other of the roller rows is expressed by R2, the radius of curvature of the raceway surface of the inner race, with which the rollers of one of the roller rows contact, is expressed by N1, and the radius of curvature of the raceway surface of the inner race, with which the rollers of the other of the roller rows contact, is expressed by N2, the following dimensional relationship establishes:

$$N1/R1 < N2/R2.$$

12. The double-row self-aligning roller bearing as claimed in claim 11, in which the radius of curvature R1 is greater than the radius of curvature R2.

13. The double-row self-aligning roller bearing as claimed in claim 11, in which the radius of curvature N1 is smaller than the radius of curvature N2.

14. The double-row self-aligning roller bearing as claimed in claim 11, in which one of the rows of the rollers having the radius of curvature R1 have a length smaller than that of the other of the rows of the rollers having the radius of curvature R2.

15. A double-row self-aligning roller bearing, which is used to support a main shaft of a wind power generator having a blade rotor mounted on the main shaft, comprising:
   an inner race, an outer race and double rows of rollers arranged between the inner race and the outer race,
   the bearing being in its entirety being divided into left and right split bearing portions each comprising a split inner race, a split outer race and a single row of rollers, in which elements associated with a load or a life are differentiated between the left and right split bearing portions,
   wherein one of the bearing portions that is arranged remote from the blade rotor has a load carrying capacity higher than that of the other of the bearing portions that is arranged close to the blade rotor, and each of the rollers of the row in the bearing portion arranged remote from the blade rotor has a length greater than that of each of the rollers of the row in the bearing portion arranged close to the blade rotor.

16. The double-row self-aligning roller bearing as claimed in claim 15, wherein one of the elements associated with the load or the life, which are to be differentiated between the left and right split bearing portions, is a material used to form at least one of the split inner race, the split outer race and the rollers.

17. The double-row self-aligning roller bearing as claimed in claim 15, wherein one of the elements associated with the load or the life, which are to be differentiated between the left and right split bearing portions, is a surface reforming treatment to be applied to a raceway surface of at least one of the split inner race and the split outer race or a rolling surface of the rollers.

18. The double-row self-aligning roller bearing as claimed in claim 15, wherein one of the elements associated with the load or the life, which are to be differentiated between the left and right split bearing portions, is a surface roughness of a raceway surface of at least one of the split inner race and the split outer race or a rolling surface of the rollers.

19. The double-row self-aligning roller bearing as claimed in claim 15, wherein one of the elements associated with the load or the life, which are to be differentiated between the left and right split bearing portions, is an axial dimension of the split inner race, the split outer race and the rollers.

20. The double-row self-aligning roller bearing as claimed in claim 15, in which a gap is provided between the two split outer races and a preload is applied to those split outer races.

21. A main shaft support structure, comprising:
   one or a plurality of bearings as defined in claim 15, disposed inside a housing.

* * * * *

UNITED STATES PATENT AND TRADEMARK OFFICE
CERTIFICATE OF CORRECTION

| | |
|---|---|
| PATENT NO. | : 7,918,649 B2 |
| APPLICATION NO. | : 10/579567 |
| DATED | : April 5, 2011 |
| INVENTOR(S) | : Naoki Nakagawa et al. |

It is certified that error appears in the above-identified patent and that said Letters Patent is hereby corrected as shown below:

First Page Item 56 Column 2 (Foreign Patent Documents), Line 1, Delete "AO" and insert -- JP --, therefor.

Signed and Sealed this
Thirteenth Day of September, 2011

David J. Kappos
*Director of the United States Patent and Trademark Office*